(12) United States Patent
Beguin et al.

(10) Patent No.: US 11,599,930 B1
(45) Date of Patent: *Mar. 7, 2023

(54) DELIVERY SERVICE SYSTEM

(71) Applicant: Amazon Technologies, Inc., Seattle, WA (US)

(72) Inventors: Julien George Beguin, San Francisco, CA (US); Douglas James Herrington, Seattle, WA (US); Richard David Young, Mission Viejo, CA (US); Toni Raquel Reid Thomelin, Seattle, WA (US); David George Butler, San Jose, CA (US); Michael James Panzitta, Bothell, WA (US); Sean Joseph Henry Oczkowski, Seattle, WA (US); Igor Fred Robert von Nyssen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

This patent is subject to a terminal disclaimer.

(21) Appl. No.: 16/160,928

(22) Filed: Oct. 15, 2018

Related U.S. Application Data

(63) Continuation of application No. 14/191,180, filed on Feb. 26, 2014, now Pat. No. 10,102,561.

(51) Int. Cl.
*G06Q 30/06* (2012.01)
*G06Q 30/0601* (2023.01)
*G06Q 30/02* (2023.01)

(52) U.S. Cl.
CPC ......... *G06Q 30/0633* (2013.01); *G06Q 30/02* (2013.01); *G06Q 30/06* (2013.01)

(58) Field of Classification Search
CPC ............................................. G06Q 30/06–08

(Continued)

(56) References Cited

U.S. PATENT DOCUMENTS

| 5,174,139 A | 12/1992 | Huang |
| 5,703,349 A | 12/1997 | Meyerson et al. |

(Continued)

FOREIGN PATENT DOCUMENTS

| EP | 1016999 A2 | 7/2000 |
| EP | 2693689 A1 | 2/2014 |

(Continued)

OTHER PUBLICATIONS

3 Mobile Apps for Converting Voice to Text, Cynthia Boris, Jan. 29, 2013 (Year: 2013).*

(Continued)

*Primary Examiner* — Ming Shui
(74) *Attorney, Agent, or Firm* — Lee & Hayes, P.C.

(57) ABSTRACT

In some cases, a delivery service system may include a handheld electronic device for use with a delivery service (e.g., a grocery delivery service). When operating in a voice input mode, the handheld electronic device may record and store audio data in memory. The stored audio data may be communicated from the handheld electronic device (e.g., via a Wi-Fi connection) to the delivery service for speech processing. When operating in a scanner input mode, the handheld electronic device may record and store item identifier information (e.g., barcode data) in memory. The stored data may be communicated to the delivery service for item identification processing. In some cases, a user interface associated with the delivery service may allow the user to review and confirm an order prior to submission of the order for delivery.

20 Claims, 10 Drawing Sheets

(58) Field of Classification Search
USPC .............................................. 705/26.1–27.2
See application file for complete search history.

(56) References Cited

U.S. PATENT DOCUMENTS

| | | | |
|---|---|---|---|
| 5,936,622 | A | 8/1999 | Halverson et al. |
| 6,119,939 | A | 9/2000 | Schwartz et al. |
| 7,542,951 | B1 | 6/2009 | Chakrabarti et al. |
| 7,680,690 | B1 | 3/2010 | Catalano |
| 7,756,757 | B1 | 7/2010 | Oakes, III |
| 8,538,829 | B1 | 9/2013 | Hu et al. |
| 8,770,484 | B2 | 7/2014 | Vanderhulst |
| 2002/0016189 | A1 | 2/2002 | Sheynblat et al. |
| 2003/0061526 | A1 | 3/2003 | Hashimoto |
| 2003/0112266 | A1 | 6/2003 | Chang et al. |
| 2003/0191649 | A1* | 10/2003 | Stout ................ H04M 3/4936 704/E15.045 |
| 2003/0212465 | A1 | 11/2003 | Howard et al. |
| 2006/0019695 | A1* | 1/2006 | Miyazaki ............ H04W 52/287 455/522 |
| 2006/0236370 | A1 | 10/2006 | John et al. |
| 2007/0077919 | A1 | 4/2007 | Chiarulli et al. |
| 2007/0094096 | A1 | 4/2007 | Hellal et al. |
| 2008/0108349 | A1 | 5/2008 | Ihattula |
| 2008/0228600 | A1 | 9/2008 | Treyz et al. |
| 2008/0235022 | A1 | 9/2008 | Bergl et al. |
| 2009/0063285 | A1 | 3/2009 | Ablowitz et al. |
| 2009/0098914 | A1 | 4/2009 | Martin-Cocher et al. |
| 2009/0124195 | A1 | 5/2009 | Kamijoh et al. |
| 2009/0275354 | A1 | 11/2009 | Bulmer |
| 2010/0009698 | A1 | 1/2010 | Yang et al. |
| 2010/0082447 | A1* | 4/2010 | Lin ................ G06Q 30/0601 705/26.1 |
| 2010/0312547 | A1 | 12/2010 | Van Os et al. |
| 2011/0177792 | A1 | 7/2011 | Bruno et al. |
| 2012/0067943 | A1 | 3/2012 | Saunders et al. |
| 2012/0150750 | A1 | 6/2012 | Law et al. |
| 2012/0158919 | A1 | 6/2012 | Aggarwal et al. |
| 2013/0018960 | A1 | 1/2013 | Knysz et al. |
| 2013/0111348 | A1 | 5/2013 | Gruber et al. |
| 2013/0145449 | A1 | 6/2013 | Busser et al. |
| 2013/0301505 | A1 | 11/2013 | Ray et al. |
| 2014/0047524 | A1 | 2/2014 | Auger |
| 2014/0282924 | A1 | 9/2014 | Singhal |
| 2015/0095188 | A1* | 4/2015 | Lee ................ G06Q 30/0633 705/26.8 |

FOREIGN PATENT DOCUMENTS

| | | | |
|---|---|---|---|
| WO | WO2012135563 | A1 | 10/2010 |
| WO | WO2012172533 | A1 | 12/2012 |
| WO | WO2013067044 | A1 | 5/2013 |

OTHER PUBLICATIONS

Bohn, "Hiku smartphone accessory seeks to Kickstart shopping lists with Evernote integration," retrieved at <<http://www.theverge.com/2012/9/25/3386562/hiku-smartphone-accessory-list-evernote>>, The Verge, Sep. 25, 2012, 5 pages.

CompactFlash Scan Card Series 5 User Manual, Socket Mobile, Newark, CA, US, Jul. 2012., 40 pages.

Drell, "Smaller Than Your Phone, This Device Could Keep You Healthy," retrieved at <<http://mashable.com/2013/11/26/tellspec/#:eyJzljoiZilslmkiOiJfa3dtaHJyb2YwNG1manJvaCJ9>>, Mashable Inc., Nov. 26, 2013, 7 pages.

Office action for U.S. Appl. No. 14/191,079, dated Jan. 12, 2017, Beguin et al., "Management of Handheld Electronic Device," 20 pages.

Office action for U.S. Appl. No. 15/714,846, dated Jan. 26, 2018, Beguin, "Management of Handheld Electronic Device," 18 pages.

Office Action for U.S. Appl. No. 14/191,180, dated Jan. 26, 2018, Beguin, "Delivery Service System," 20 pages.

Office action for U.S. Appl. No. 14/191,079, dated Nov. 22, 2016, Beguin et al., "Management of Handheld Electronic Device," 24 pages.

Office action for U.S. Appl. No. 14/191,239, dated Nov. 23, 2016, Beguin et al., "Device for Delivery Service," 24 pages.

Office action for U.S. Appl. No. 14/191,271, dated Dec. 12, 2016, Butler et al., "Electronic Device Task Serialization," 12 pages.

Office Action for U.S. Appl. No. 14/191,271, dated Feb. 6, 2018, Butler et al., "Electronic Device Task Serialization," 10 pages.

Office action for U.S. Appl. No. 14/191,079, dated Mar. 16, 2016, Beguin et al., "Management of Handheld Electronic Device," 20 pages.

Office action for U.S. Appl. No. 14/191,180, dated Apr. 20, 2017. Beguin et al., "Delivery Service System," 26 pages.

Office action for U.S. Appl. No. 14/191,239, dated Apr. 20, 2017, Beguin et al., "Device for Delivery Service," 27 pages.

Office action for U.S. Appl. No. 14/191,271, dated May 31, 2018, Butler, "Electronic Device Task Serialization," 9 pages.

Office action for U.S. Appl. No. 14/191,079, dated Jun. 28, 2016, Beguin et al., "Management of Handheld Electronic Device," 20 pages.

Office action for U.S. Appl. No. 14/191,271, dated Jul. 10, 2017, Butler et al., "Electronic Device Task Serialization," 9 pages.

Office action for U.S. Appl. No. 14/191,079 dated Sep. 11, 2015, Beguin et al., "Management of Handheld Electronic Device," 13 pages.

PCT Search Report and Written Opinion dated May 13, 2015 for PCT Application No. PCT/US15/17384, 11 pages.

PCT Search Report and Written Opinion dated Jun. 10, 2015 for PCT application No. PCT/US2015/017378, 11 pages.

PCT Search Report and Written Opinion dated Jun. 18, 2015 for PCT application No. PCT/US2015/017375, 12 pages.

YouTube, "Hiku Labs Hiku shopping list assistance," retrieved on Apr. 18, 2018 at <<https://www.youtube.com/watch?v=jgEUkM5B30U>> 2 pages.

Office Action for U.S. Appl. No. 14/191,271, dated Apr. 10, 2019, Butler, "Electronic Device Task Serialization", 10 pages.

* cited by examiner

DELIVERY SERVICE SYSTEM

RELATED APPLICATION

This application is a continuation of and claims priority to U.S. patent application Ser. No. 14/191,180, filed on Feb. 26, 2014, which is incorporated by reference herein.

BACKGROUND

Keeping track of ongoing shopping needs may be challenging. For example, many families may find it difficult to organize requests from each family member. Further, shoppers may forget to purchase items and may only realize that they forgot to purchase certain items until after returning from a shopping trip.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure includes, in part, techniques and arrangements for identifying products for delivery via a delivery service (e.g., a grocery delivery service). The present disclosure describes a handheld electronic device that may operate in at least one of a voice input mode or a scanner input mode to allow the user to identify products. In some embodiments, the handheld electronic device may include a scanner. The scanner may allow the user to add a particular item to a list by scanning an item identifier (e.g., a barcode, a quick response (QR) code, radio-frequency identification (RFID), near-field communication (NFC) identifier, or other identifier) on a product or product package. A scanned identifier may be stored in a memory of the handheld electronic device (e.g., as barcode data). A microphone may allow a user to provide a voice input to be stored in the memory as audio data. The handheld electronic device may communicate the audio data and/or scanned item identifier information (e.g., barcode data) to a remote system for processing. The remote system may perform speech processing operation(s) on the audio data and may perform item identification operation(s) based on the scanned item identifier information. In some cases, a user interface associated with the delivery service may allow the user to review and confirm an order prior to submission of the order for delivery.

Figure 1:
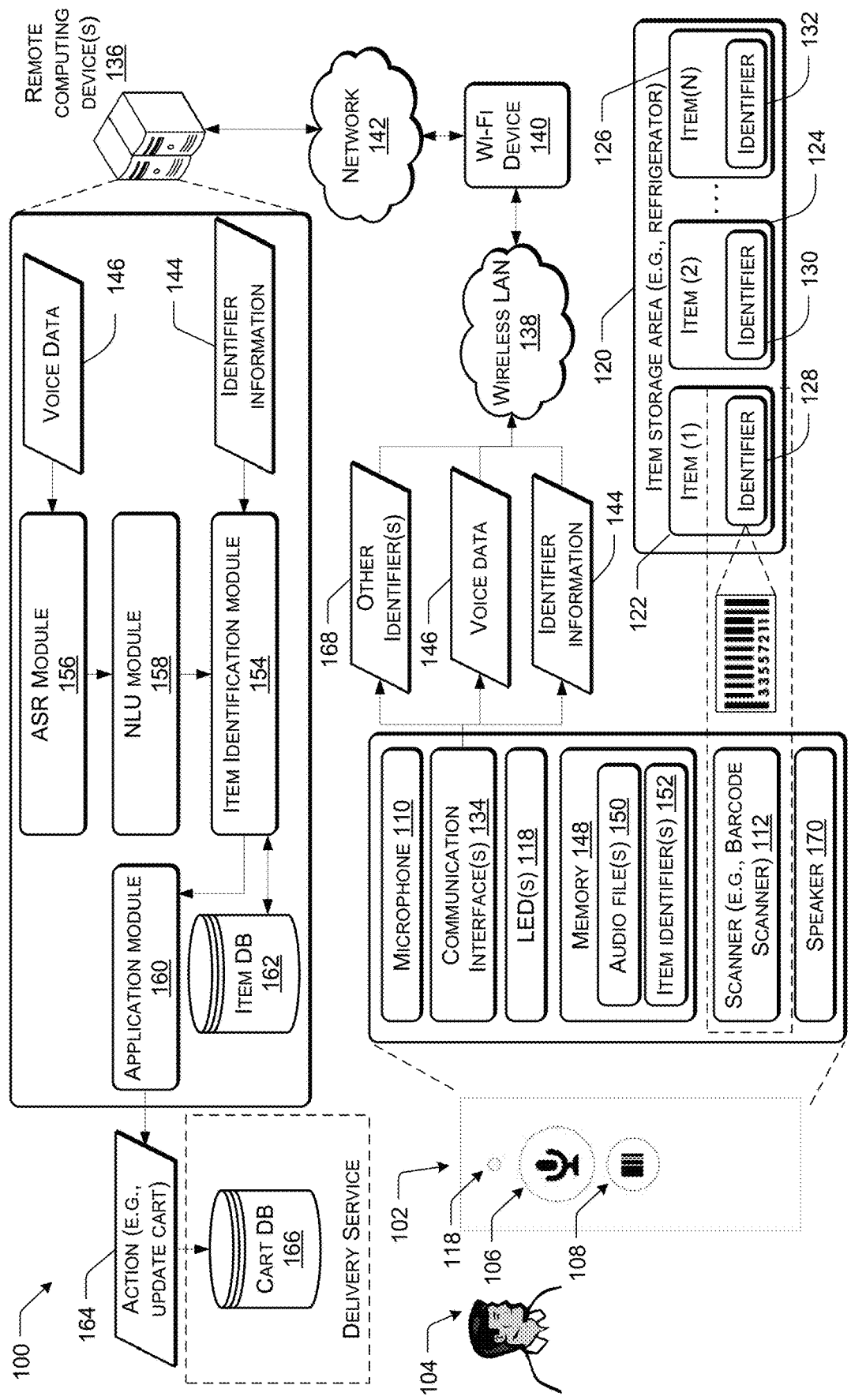
FIG. 1 illustrates an example framework for a delivery service that receives voice and/or scanner input from a handheld electronic device, according to some implementations.

FIG. 1 illustrates an example framework 100 for a delivery service that receives voice and/or scanner input from a handheld electronic device, according to some implementations. FIG. 1 shows illustrative interactions between a handheld electronic device 102, a user 104, and a remote system when performing various operations, including ordering products (e.g., groceries) for home delivery. The handheld electronic device 102 allows the user 104 to both scan an item and to provide voice information to identify a particular product.

In the illustrative example of FIG. 1, the handheld electronic device 102 includes a first selectable control 106 and a second selectable control 108. To illustrate, selection by the user 104 may include user actuation of a physical button, trigger, or switch. In the embodiment illustrated in FIG. 1, the first selectable control 106 includes a first user actuatable button identified by a microphone icon, and the second selectable control 108 includes a second user actuatable button identified by a barcode icon.

Figure 2:
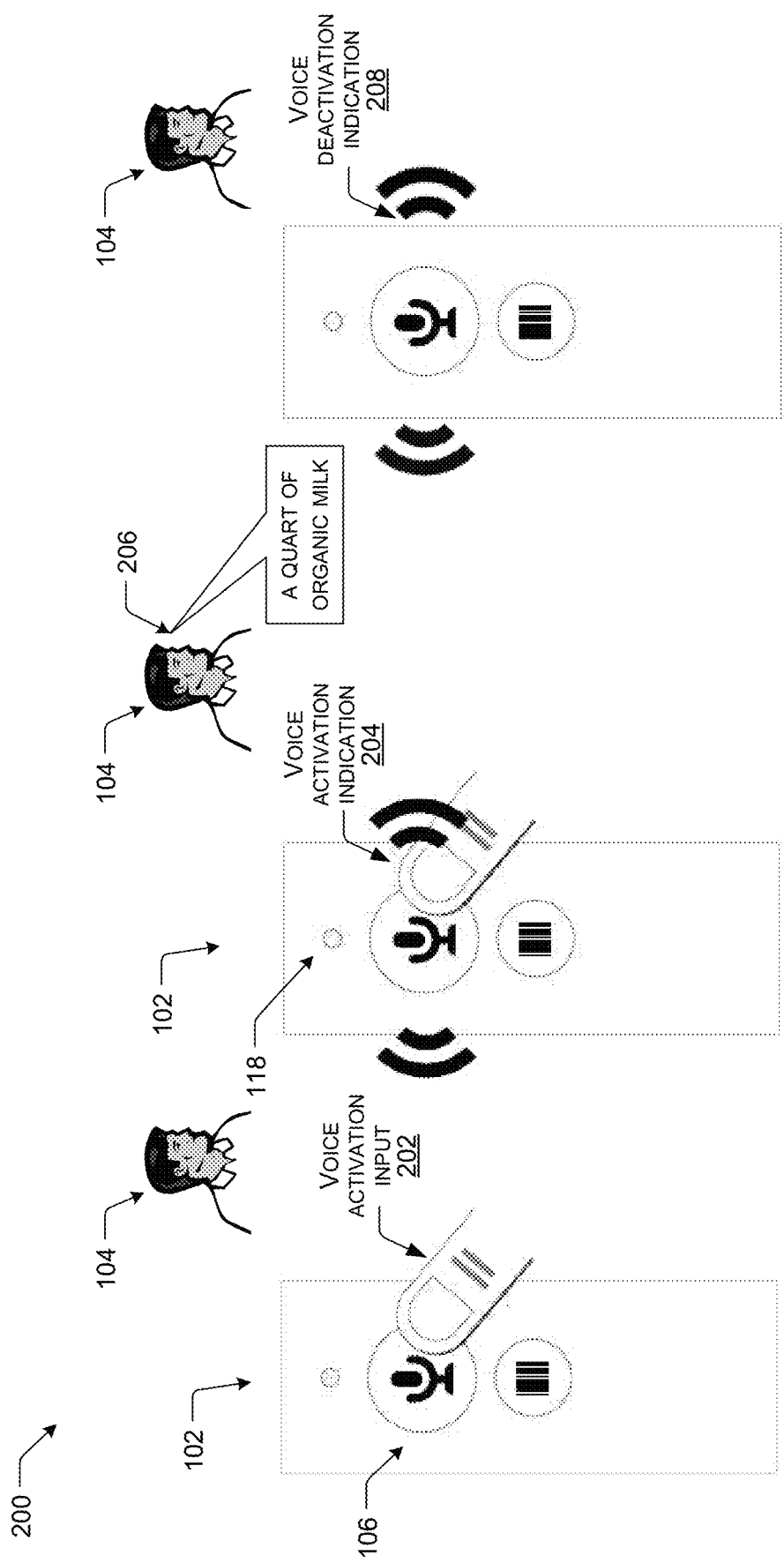
FIG. 2 illustrates an example of a handheld electronic device receiving voice input from a user to be provided to a delivery service, according to some implementations.

The handheld electronic device 102 includes a microphone 110 (or other audio input component) configured to receive a voice input from the user 104 (see e.g., the voice input 206 of "a quart of organic milk" in FIG. 2). The handheld electronic device 102 further includes a scanner 112 (e.g., a barcode scanner or other optical component such as a camera) to scan an item identifier (e.g., a barcode on a product package). The scanner 112 may be activated in response to the user actuation of the second selectable control 108. To illustrate, the user 104 may select the second selectable control 108 while the user 104 is pointing the handheld electronic device 102 towards a particular item to be identified. In the embodiment illustrated in FIG. 1, the handheld electronic device 102 includes one or more light sources 118, such as light emitting diodes (LEDs), that may be illuminated in response to user actuation of one or both of the selectable controls 106 and 108.

FIG. 1 further illustrates an item storage area 120 (e.g., a refrigerator or a pantry, among other alternatives) that includes one or more items. In the example of FIG. 1, the item storage area 120 includes a first item 122 identified as Item (1) and a second item 124 identified as Item (2). It will be appreciated that the item storage area 120 may include alternative numbers of items, with an Nth item 126 identified as Item (N) in FIG. 1. Each item in the item storage area 120 may include a barcode or other visual identifier (e.g., a product logo, etc.) on a product package. For example, as illustrated in FIG. 1, an identifier 128 of the first item 122 may include a scannable barcode. While not illustrated in FIG. 1, an identifier 130 of the second item 124 and an identifier 132 of the Nth item 126 may also include scannable barcodes or other visual identifiers.

The handheld electronic device 102 further includes one or more communication interfaces 134 to communicate with one or more remote computing devices 136. In some cases, the handheld electronic device 102 may have access to the Internet via a wired or wireless connection, such as via a WiFi connection or via a cellular telephone network (e.g., a Long Term Evolution or LTE network), among other alternatives (e.g., Bluetooth®). In the example of FIG. 1, the handheld electronic device 102 may have access to the Internet via a wireless local area network (WLAN) 138 connection with a WiFi device 140 (e.g., a gateway or router), which may be connected to the Internet via a wired connection (e.g., via a cable modem or a digital subscriber line (DSL) modem, among other alternatives). Further, it will be appreciated that the handheld electronic device 102 may include one or more encryption components to encrypt information prior to communication via the one or more communication interfaces 134. In a particular embodiment, communications from the handheld electronic device 102 may be signed with a signature (e.g., a HMAC-SHA1 signature) at the end of an associated message.

The network 142 may be a publicly accessible network of linked networks, possibly operated by various distinct parties, such as the Internet. In other embodiments, the network 142 may include a private network, personal area network ("PAN"), LAN, WAN, cable network, satellite network, etc. or some combination thereof, each with access to and/or from the Internet. For example, the one or more remote computing devices 136 may be located within a single data center, and may communicate via a private network as described above.

The handheld electronic device 102 is configured to communicate identifier information 144 (e.g., barcode information or a product logo image) associated with a particular scanned item (e.g., the first item 122 in FIG. 1) to the one or more remote computing devices 136. Further, the handheld electronic device 102 is configured to communicate voice data 146 associated with a voice input received from the user 104 via the microphone 110. In some cases, the voice data 146 may represent an audio recording of the user's speech that may be stored in a memory 148 of the handheld electronic device 102 as audio data (e.g., as one or more audio files 150). Further, the memory 148 may store one or more item identifiers (e.g., the one or more item identifiers 152 in FIG. 1) that are associated with the scanned item(s) for communication to the one or more remote computing devices 136. Further, the handheld electronic device 102 may be configured to communicate other identifier(s) 168 (e.g., at least one of a customer account identifier or a device identifier) to the remote computing device(s) 136. While not shown in the example of FIG. 1, in some cases the other identifier(s) 168 may be stored in the memory 148. Further, in some cases, handheld electronic device 102 may be configured to store metadata associated with voice and/or scanner input. To illustrate, the handheld electronic device 102 may determine a time associated with a received voice input and/or a time associated with a particular item scan and store the time(s) in the memory 148. Further, in some cases, the metadata may include a location (e.g., a global positioning system (GPS) location) of the handheld electronic device 102 when the user 104 provides a particular voice input and/or when the user 104 scans a particular item. As an illustrative, non-limiting example, the handheld electronic device 102 may be unable to establish a wireless connection with the Wi-Fi device 140 (e.g., when the handheld electronic device 102 is outside of a Wi-Fi range of the Wi-Fi device 140). As such, there may be a delay associated with communicating information to the one or more remote computing devices 136, and metadata such as time and/or location may be useful for providing context for the received voice/scanner input information.

The handheld electronic device 102 may correspond to a wide variety of electronic devices. In some embodiments, the handheld electronic device 102 may be a computing device that includes one or more processors, and the memory 148 may contain software applications executed by the processors (see e.g., the computing device 600 of FIG. 6). Software of the handheld electronic device 102 may include components for establishing communications over wireless or wired communication networks or directly with other computing devices. In some cases, the handheld electronic device 102 may include an electronic device that is dedicated to ordering or reordering products via voice, scanning or a combination thereof, and may, as an example, include a handle (not shown) to attach the handheld electronic device 102 to a hook (e.g., in a kitchen or pantry area) for safe-keeping.

The one or more remote computing devices 136 of FIG. 1 include item identification processing capabilities as well as spoken language processing capabilities. Spoken language processing systems generally include various modules and components for receiving speech input from a user, determining what the user said, and determining what the user meant. For example, a natural language processing ("NLP") system may perform speech recognition and generate spoken language processing results, including the likely meaning of user utterances, for use by applications that respond to user utterances. FIG. 1 illustrates a particular example of an NLP system that includes components to perform various automatic speech recognition (ASR) operations and natural language understanding (NLU) operations.

In the embodiment illustrated in FIG. 1, the one or more remote computing devices 136 include an item identification module 154, an automatic speech recognition ("ASR") module 156, a natural language understanding ("NLU") module 158, and an application module 160. The item identification module 154 is configured to identify the scanned item (e.g., the first item 122 in the example of FIG. 1) based on the identifier information 144 (e.g., barcode information or an image of a product logo) received from the handheld electronic device 102. For example, the item identification module 154 may query at least one item database (DB) 162 that stores information for a plurality of items, with each item associated with one or more product identifiers.

FIG. 1 illustrates an example in which speech processing is performed on the one or more remote computing devices 136. That is, the handheld electronic device 102 may not include speech processing capabilities but rather may include audio recording capabilities to record the voice input and store the recording as audio data in the memory 148 (e.g., as one or more audio files 150). The recorded voice input may be communicated from the handheld electronic device 102 to the one or more remote computing devices 136 for transcription by the ASR module 156. The ASR module 156 is configured to receive the voice data 146 and to generate one or more likely transcriptions of the utterance. In some cases, the ASR module 156 may provide a transcription or N-best list of transcriptions to the NLU module 158. The NLU module 158 may identify particular words (e.g., named entities) in the transcription or N-best list of transcriptions that are of particular importance in determining the user's intent.

The NLU module 158 is configured to generate a semantic representation of the user utterance based on the information from the ASR module 156. That is, the NLU module 158 may determine what the user 104 would like to do, also known as the user intent, based on recognized speech. A semantic representation may include one or more user intents and one or more named entities. For example, a user intent may indicate a quantity of an item ("two quarts of organic milk"), a modification of a characteristic of an item ("organic milk but in gallon size"), or an action to be performed ("add organic milk to my shopping cart"). A named entity may include, for example, items ("milk" or "Green Cow gallon whole milk"), features of items ("gallon" or "two percent"), or quantities of items ("two" or "a dozen").

After the NLU module 158 has produced results (e.g., has determined one or more likely interpretations) and, optionally, scores for those results (such as a confidence score representing a probability that the results are valid or accurate), the most likely or appropriate interpretation may be selected. The NLU module 158 may generate an output that may be used by a computer application (e.g., the application module 160) to respond or otherwise perform an action 164 according to the user's intent. To illustrate, in the example of FIG. 1, the voice input from the user 104 may be associated with a particular item to be ordered (see e.g., FIG. 2, "a quart of organic milk"), and the action 164 may include updating a virtual shopping cart of the user 104 (e.g., stored in a cart database 166 associated with the delivery service).

In the example of FIG. 1, the components of the NLP system are illustrated as being stored on one or more remote computing devices 136. In some embodiments, the NLP system can include several devices physically or logically grouped together, such as an application server computing device configured to perform speech recognition on an utterance and a database server computing device configured to store records and speech recognition models. In multi-device implementations, the various devices may communicate via an internal communication network, such as a corporate or university network configured as a local area network ("LAN") or a wide area network ("WAN"). In some cases, the devices may communicate over an external network, such as the Internet, or a combination of internal and external networks.

In some embodiments, the features and services provided by the NLP system may be implemented as web services consumable via the network 142. In further embodiments, the features and services may be provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In the embodiment illustrated in FIG. 1, speech processing is performed on the one or more remote computing devices 136 (e.g., via the ASR module 156 and the NLU module 158). That is, in some cases, the handheld device 102 may not include component(s) to perform speech processing operations but rather may record speech received from the user 104, store the speech as audio data in the memory 148, and communicate the data for remote processing. Alternatively, in some cases, one or more speech processing operations may be performed at the handheld electronic device 102. For example, the handheld electronic device 102 may store an ASR module and/or an NLU module locally in the memory 148 and may be configured to perform speech processing operations in a manner similar to or the same as the ASR module 156 and/or the NLU module 158 illustrated as stored on the one or more remote computing devices 136 in FIG. 1.

Further, in the embodiment illustrated in FIG. 1, processing of the scanned item identifier(s) 152 (e.g., barcode data) is performed on the one or more remote computing devices 136 (e.g., via the item identification module 154 using the item database 162). That is, in some cases, the handheld device 102 may not include component(s) to perform item identification processing operation(s) but rather may scan an item identifier (e.g., a barcode), store barcode data in the memory 148, and communicate the stored data for remote processing. Alternatively, in some cases, one or more item identification processing operations may be performed at the handheld electronic device 102. For example, the handheld electronic device 102 may store an item identification module (and an associated item database in some cases) locally in the memory 148. As such, the handheld electronic device 102 may perform one or more item identification processing operations in a manner similar to or the same as the item identification module 154 illustrated as stored on the one or more remote computing devices 136 in FIG. 1.

Referring to FIG. 2, an example of the user 104 activating a voice input mode in order to provide voice input via the handheld electronic device 102 is illustrated and generally designated 200.

In the example of FIG. 2, the first selectable control 106 includes an actuatable button identified by a microphone icon. A voice activation input 202 may include the user 104 depressing the first selectable control 106 to activate the microphone 110 on the handheld electronic device 102 in order to record speech in a voice input mode. In response to receiving the voice activation input 202, the handheld electronic device 102 may provide a voice activation indication 204 to alert the user 104 that the voice input mode is active and that audio received via the microphone 110 is being recorded and stored to the memory 148. In the example of FIG. 2, the voice activation indication 204 is illustrated as audio provided via the speaker 170. In some cases, the audio may include a beep, music, or speech such as "Voice input mode activated." Alternatively or additionally, the voice activation indication 204 may include activation of one or more of the LEDs 118 or a vibration, among other alternatives. Upon activation of the voice input mode, the user 104 may provide a voice input 206. As an illustrative, non-limiting example, the user 104 may speak "a quart of organic milk," which may be recorded by the handheld electronic device 102 and stored in the memory 148 as audio data (e.g., as the audio file 150). The audio data (e.g., the audio file 150) may be communicated to the one or more remote computing devices 136 as the voice data 146, for speech processing.

In some cases, the voice input mode is deactivated in response to the handheld electronic device 102 detecting that the first selectable control 106 is no longer depressed. That is, the user 104 may depress the first selectable control 106 and continue to depress the first selectable control 106 until the user 104 is finished speaking. Alternatively, the voice input mode may remain active until the user 104 depresses the first selectable control 106 for a second time after the user 104 is finished speaking. That is, the user 104 may depress the first selectable control 106 a first time, release the first selectable control 106 after the voice activation indication 204, speak the voice input 206, and depress the first selectable control 106 a second time after the user 104 is finished speaking to deactivate the voice input mode.

Figure 3:
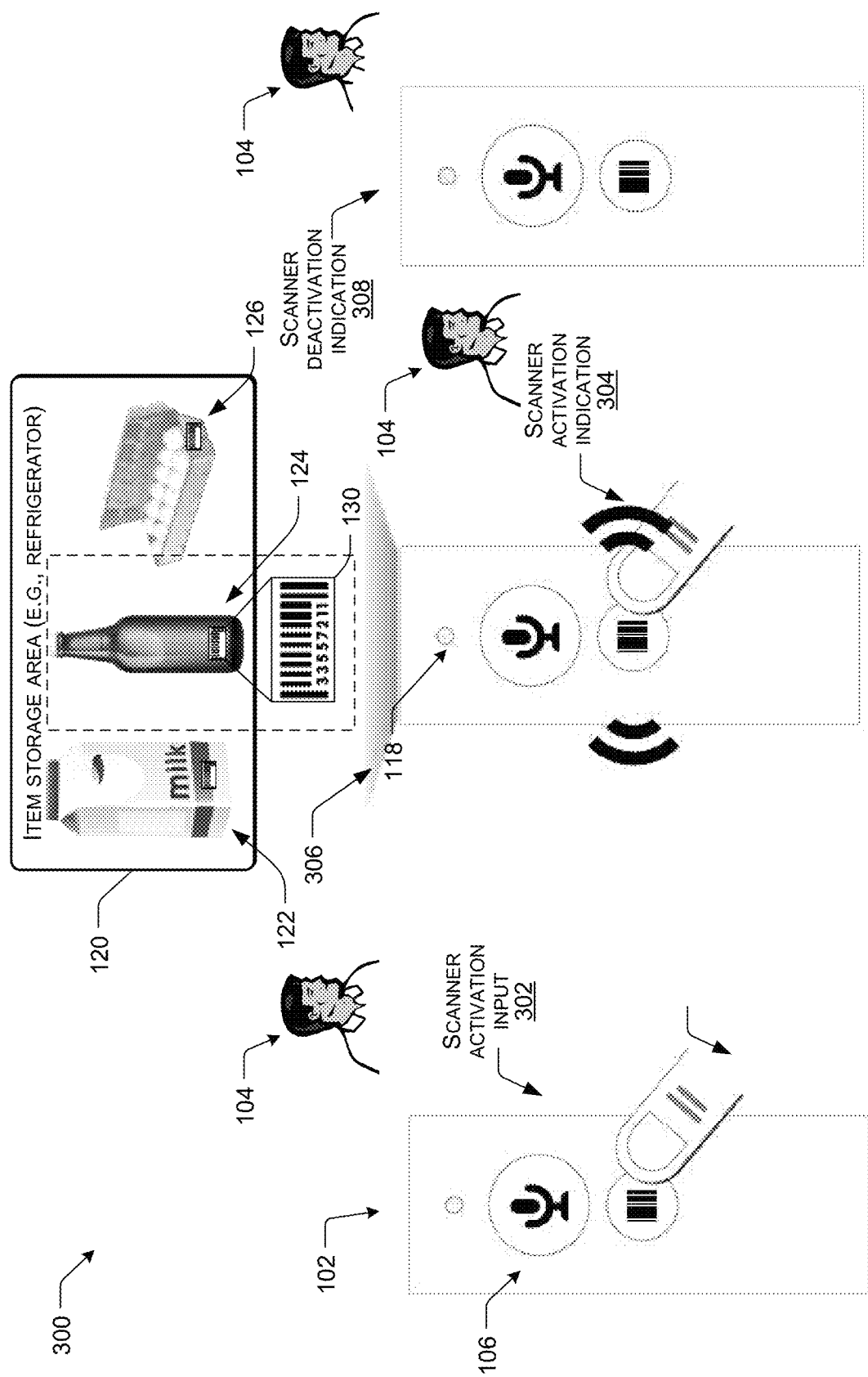
FIG. 3 illustrates an example of a handheld electronic device identifying barcode information to be provided to a delivery service, according to some implementations.

In the particular example illustrated in FIG. 2, after receiving the voice activation input 202, the user 104 may continue to depress the first button 106 until the user 104 has finished speaking. FIG. 2 illustrates that, in some cases, a voice deactivation indication 208 may notify the user 104 that the handheld electronic device 102 has ceased operating in the voice input mode. The voice deactivation indication 208 may provide privacy protection so that the user 104 knows that her speech is no longer being recorded. For example, the voice deactivation indication 208 may include audio provided via the speaker 170. In some cases, the audio may include a beep, music, or speech such as "Voice input mode deactivated." Alternatively or additionally, the voice deactivation indication 208 may include activation of one or more of the LEDs 118 or a vibration, among other alternatives. Referring to FIG. 3, an example of the user 104 activating a scanner input mode in order to scan a product identifier (e.g., a barcode) using the handheld electronic device 102 is illustrated and generally designated 300.

In the example of FIG. 3, the second selectable control 108 includes an actuatable button identified by a barcode icon. A scanner activation input 302 may include the user 104 depressing the second selectable control 108 in order to activate the scanner 112 to scan a barcode or other product identifier (e.g., a logo or image on a product package). In response to receiving the scanner activation input 302, the handheld electronic device 102 may provide a scanner activation indication 304 to alert the user 104 that the scanner input mode is active. In the example of FIG. 3, the scanner activation indication 304 is illustrated as audio provided via the speaker 170. In some cases, the audio may include a beep, music, or speech such as "Scanner input mode activated." Alternatively or additionally, the scanner activation indication 304 may include activation of one or more of the LEDs 118 or a vibration, among other alternatives. FIG. 3 further illustrates that light associated with an activated scanner, as shown at 306, may also serve to notify the user 104 that the scanner input mode is active.

FIG. 3 illustrates an example in which, upon activation of the scanner input mode, the user 104 may scan the identifier 130 of the second item 124 in the item storage area 120. Information associated with the scanned identifier 130 may be stored in the memory 148 as the item identifier 152 and communicated to the one or more remote computing devices 136 as the identifier information 144, for item identification processing.

In some cases, the scanner input mode is deactivated in response to the handheld electronic device 102 detecting that the second selectable control 108 is no longer depressed. That is, the user 104 may depress the second selectable control 108 and continue to depress the second selectable control 108 until the user 104 is finished scanning one or more product identifiers. Alternatively, the scanner input mode may remain active until the user 104 depresses the second selectable control 108 for a second time after the user 104 is finished scanning one or more product identifiers. That is, the user 104 may depress the second selectable control 108 a first time, release the second selectable control 108 after the scanner activation indication 304, scan one or more product identifiers, and depress the second selectable control 108 a second time to deactivate the scanner input mode. In the particular example illustrated in FIG. 3, after receiving the scanner activation input 302, the user 104 may continue to depress the second button 108 until the user 104 has finished scanning. FIG. 3 illustrates that, in some cases, the lack of the light 306 associated with an activated scanner 112 may serve as a scanner deactivation indication 308 in order to notify the user 104 that the handheld electronic device 102 has ceased operating in the scanner input mode.

While not illustrated in FIG. 3, the handheld electronic device 102 may provide an alternative or additional scanner deactivation indication to notify the user 104 that the handheld electronic device 102 has ceased operating in the scanner input mode. For example, the scanner deactivation indication may include audio provided via the speaker 170. In some cases, the audio may include a beep, music, or speech such as "Scanner input mode deactivated." Alternatively or additionally, the scanner deactivation indication may include activation of one or more of the LEDs 118 or a vibration, among other alternatives.

In some cases, the user 104 may desire to provide a shorthand identifier of an item to be stored for future reference. In some embodiments, the user 104 may use a combination of the first selectable control 106 and the second selectable control 108 to provide such a shorthand identifier. To illustrate, referring to the example of FIG. 3, the second item 124 may include a particular brand or type of beer (e.g., "Spokane's Worst Beer"). In one example, the user 104 may select the first selectable control 106 to enter the voice input mode and speak "This is my favorite beer." The user 104 may subsequently select the second selectable control 108 to enter the scanner input mode and scan the barcode identifier 130 (e.g., on a bottle of the beer or on product packaging). Alternatively, the user 104 may first select the second selectable control 108 to enter the scanner input mode and scan the barcode identifier 130. The user 104 may subsequently select the first selectable control 106 to enter the voice input mode and speak "This is my favorite beer."

This speech along with information associated with the scanned barcode identifier 130 may be provided to the one or more remote computing devices 136 and may be stored (e.g., in the item database 162 or the cart database 166, among other alternatives) for future reference. When the user 104 desires to re-order the same type of beer in the future, the user 104 may speak "Order a six-pack of my favorite beer" or something similar that may be received via the microphone 110 of the handheld electronic device 102. In this case, the NLU module 158 may be able to automatically determine that the likely user intent is to add a six-pack of Spokane's Worst Beer to the user's shopping cart. Thus, the present disclosure may provide an enhanced user experience by allowing the user 104 to order or re-order items via shorthand audible references to particular products.

As another example, the user 104 may wish to provide feedback with respect to a particular item. To illustrate, the third item 126 in the item storage area 120 may include a particular brand or type of eggs. The user 104 may desire to provide a favorable or unfavorable rating for use by other consumers when making decisions regarding which type of eggs to order. To illustrate, the user 104 may enter the voice input mode and speak "I don't like these eggs" either before or after entering the scanner input mode and using the scanner 112 to identify the third item 126. This speech along with information associated with a scanned identifier 132 of the third item 126 may be provided to the one or more remote computing devices 136 and may be stored (e.g., in the item database 162) as feedback that may be provided to other customers that are interested in shopping for eggs.

As another example, the user 104 may wish to request supplemental information for a scanned item (e.g., the first item 122). In the example of FIG. 3, the first item 122 includes a quart of milk. In some cases, the user 104 may desire to order the same type of milk in a different size. As an illustrative, non-limiting example, the user 104 may speak "What other sizes are available?" which may be recorded by the handheld electronic device 102 and stored in the memory 148 as audio data (e.g., as the audio file 150). As explained above, in some cases, the user 104 may enter the voice input mode to provide the voice input either before or after entering the scanner input mode to scan the barcode 128. The associated identifier information 144 and voice data 146 may be communicated to the one or more remote computing devices 136 for processing.

The ASR module 156 may transcribe the voice data 146, and the item identification module 154 may query the item database 162 based on the identifier information 144 in order to retrieve item information for the first item 122. The NLU module 158 may use the transcription from the ASR module 156 and the item information retrieved by the item identification module 154 to determine that the likely intent of the user 104 is to identify sizes of the particular brand of milk other than the quart size. That is, the NLU module 158 may determine that the user intent associated with a transcription of "What other sizes are available?" may roughly correspond to "What sizes, excluding the quart size, is Green Cow Organic Milk available in?" and may direct the application module 160 to determine this information (e.g., by querying the item database 162). To illustrate, the application module 160 may determine that the other available sizes include a gallon size and a pint size.

In some cases, the supplemental information may be communicated to the handheld electronic device 102 to be presented to the user 104 in an audible format via the speaker 170. For example, the supplemental information may be provided to the handheld electronic device 102 in an audio file format. As another example, the supplemental information may be provided in a text file format, and the handheld electronic device 102 may optionally include a text to speech (TTS) module (not shown in FIGS. 1-3; see e.g., FIG. 6) to convert the supplemental information into speech for audible presentation to the user 104 via the speaker 170. Alternatively, the supplemental information may be provided to the user 104 via a user interface accessible via a device other than the handheld electronic device 102 (see e.g., the user interface 400 of FIG. 4 that, in some cases, may be presented via a web browser). While FIG. 4 illustrates an example of a user interface that may be presented via a web browser, it will be appreciated that information may be presented to the user 104 via another application (e.g., a smartphone application or an application associated with a wearable device).

As a further example, the user 104 may desire to determine additional product information related to the first item 122 (e.g., nutrition information or allergy information, among other alternatives). As an illustrative, non-limiting example, the user 104 may speak "What is the fat content per serving?" which may be recorded by the handheld electronic device 102 and stored in the memory 148 as audio data (e.g., as the audio file 150). As explained above, in some cases, the user 104 may enter the voice input mode to provide the voice input either before or after entering the scanner input mode to scan the barcode 128. The associated identifier information 144 and voice data 146 may be communicated to the one or more remote computing devices 136 for processing.

The ASR module 156 may transcribe the voice data 146, and the item identification module 154 may query the item database 162 based on the identifier information 144 in order to retrieve item information for the first item 122. The NLU module 158 may use the transcription from the ASR module 156 and the item information retrieved by the item identification module 154 to determine that the likely intent of the user 104 is to identify nutrition information related to the particular brand of milk. That is, the NLU module 158 may determine that the user intent associated with a transcription of "What is the fat content per serving?" may roughly correspond to "What is the fat content per serving of Green Cow Organic Milk?" and may direct the application module 160 to determine this information (e.g., by querying the item database 162). As explained above, in some cases, the supplemental information may be communicated to the handheld electronic device 102 to be presented to the user 104 in an audible format via the speaker 170. Alternatively, the supplemental information may be provided to the user 104 via a user interface accessible via a device other than the handheld electronic device 102 (see e.g., the user interface 400 of FIG. 4 that, in some cases, may be presented via a web browser).

Figure 4:
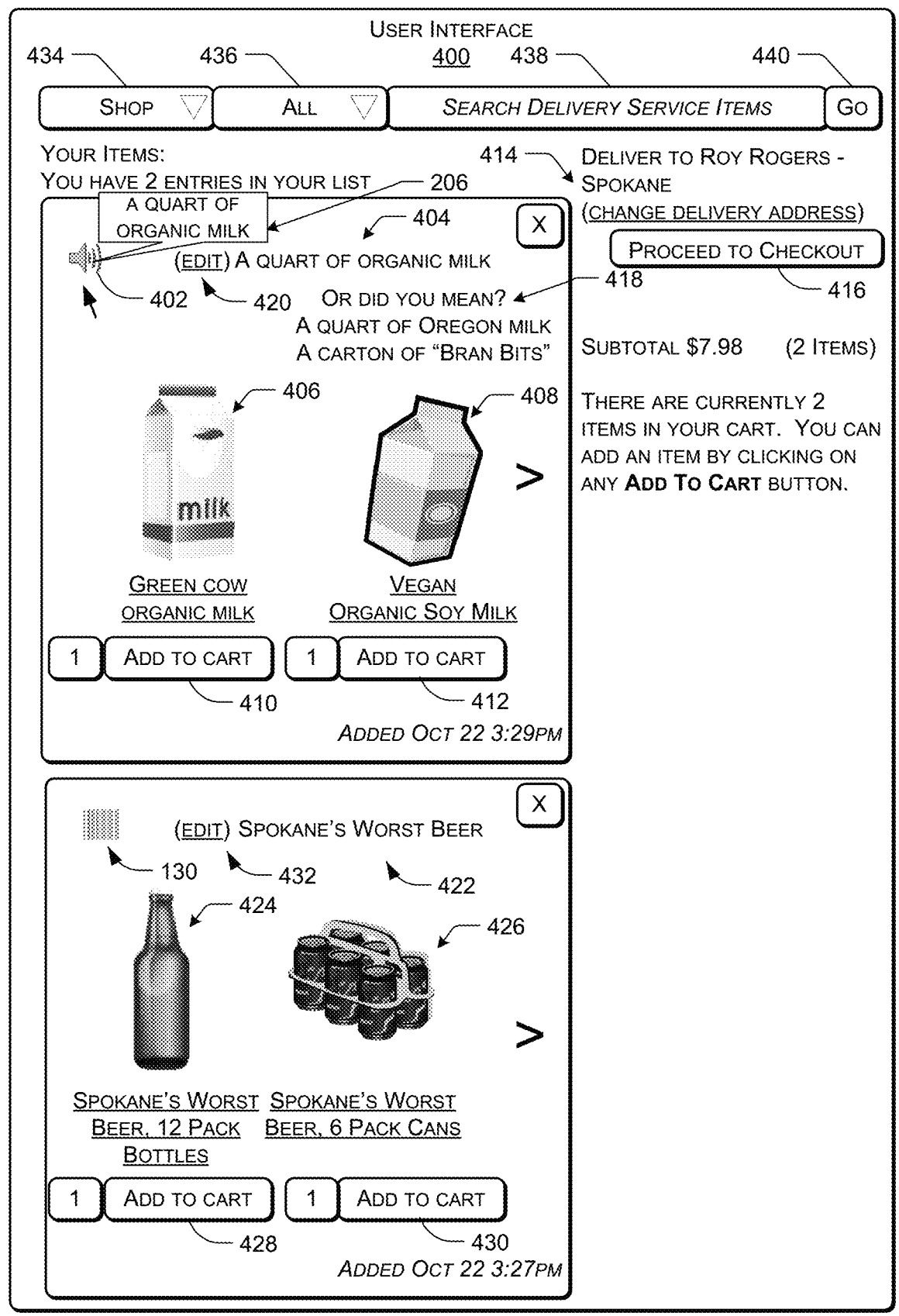
FIG. 4 illustrates an example of a user interface associated with a delivery service, according to some implementations.

Referring to FIG. 4, an example user interface associated with a delivery service is illustrated and generally designated 400. FIG. 4 illustrates that the user 104 may review an order in order to verify that the user intent was accurately captured and to resolve any inconsistencies. In some cases, the user interface 400 may be presented on an electronic device other than the handheld electronic device 102 (which does not include a display in the example embodiments illustrated in FIGS. 1-3). For example, the user 104 may access the user interface 400 via a web browser on a laptop computer, a desktop computer, a phone, or a tablet computer, among other alternatives.

In FIG. 4, a selectable icon 402 (illustrated as an image of a speaker) may be associated with each audio recording received from the user 104. To illustrate, the voice input 206 received from the user 104 may correspond to "a quart of organic milk" (see e.g., FIG. 2). The user 104 may select the selectable icon 402 to review the audio recording for comparison to a speech processing result 404. Thus, the user 104 may verify that the speech processing system correctly recognized the voice input 206.

FIG. 4 further illustrates a particular example in which the user 104 may be presented with multiple alternative products for selection. To illustrate, a first product 406 may include a quart of Green Cow Organic Milk, which may correspond to the second item 122 in the item storage area 120 (e.g., the refrigerator) of the user 104. In the example of FIG. 4, the user interface 400 displays a representation of the product packaging of a quart of Green Cow Organic Milk. FIG. 4 further illustrates that a second product 408 may be identified that is different from the second item 122. For example, the second product 408 may include a quart size of "Vegan Organic Soy Milk," and the user interface 400 may display a representation of the product packaging of the second product 408. The second product 408 may be identified based on one or more factors, including but not limited to customer account history associated with the user 104, such as a mapping of search terms to what the user 104 purchases. While two products are illustrated in the example of FIG. 4, alternative numbers of products may be displayed and/or the user interface 400 may allow the user 104 to navigate to display additional identified products (e.g., using left/right arrows).

In some cases, alternative or additional information associated with the first product 406 or the second product 408 may be displayed to assist the user 104 in selecting a particular desired product. For example, while not shown in FIG. 4, in some cases, the user 104 may hover over a particular product for a particular period of time. In response, additional product information may be displayed for review via the user interface 400 (e.g., via a popup window). In the example illustrated in FIG. 4, the user 104 may add a particular quantity (e.g., a quantity of one in the example of FIG. 4) of the first product 406 to a shopping cart by selecting a first selectable icon 410 (e.g., "Add to cart") associated with the first product 406. Similarly, the user 104 may add a particular quantity (e.g., a quantity of one in the example of FIG. 4) of the second product 408 to the shopping cart by selecting a second selectable icon 412 associated with the second product 408. While not shown in the example of FIG. 4, in some cases, the user interface 400 may present alternative locations to purchase a particular product in the event that the particular product is not available or is currently out of stock. In some cases, if the particular product is currently out of stock, the user interface 400 may present information about a time that the particular product is expected to be available for delivery. Further, the user 104 may edit or identify delivery information, as shown at 414. Additional information presented by the user interface 400 may include a subtotal for one or more items added to the shopping cart, and the user 104 may complete an order by selecting a checkout icon 416 (e.g., "Proceed to checkout"). In some cases, after adding one or more products to the shopping cart and closing an associated window, the user 104 may have an option of re-displaying the information.

In the embodiment illustrated in FIG. 4, multiple alternative interpretations of the voice input 206 may be presented for user selection. As shown at 418, the user interface 400 may display "Did you mean?" or similar language followed by one or more alternative interpretations. In this case, one alternative interpretation that may be identified as having a next highest confidence level may be "A quart of Oregon milk," while another alternative interpretation having a lower confidence level may be "A carton of Bran Bits." In some cases, the alternative interpretations may be displayed for each speech processing result, while in other cases the alternative interpretations may be displayed when there is a low-confidence match for a particular speech processing result. In some cases, upon selection of one of the alternative interpretations, the products that are currently displayed may be updated. To illustrate, in response to a user selection of the alternative interpretation of "A quart of Oregon milk," the first product 406 and the second product 408 may be replaced with one or more products that are identified based on this alternative interpretation. That is, the one or more replacement products may include quart-sized milk product(s) from the state of Oregon.

As another example, while not illustrated in FIG. 4, a voice input from the user 104 may represent multiple utterances, with different interpretations depending on whether particular utterances are processed individually or together. To illustrate, the user 104 may speak "orange juice," which could be interpreted as a first utterance that identifies a first item (i.e., "orange") followed by a second utterance that identifies a second item (i.e., "juice") or which could be interpreted as a single utterance that identifies one item (i.e., "orange juice"). In this case, the "Did you mean?" area 418 may include these alternative interpretations in order to prompt a user to identify the proper interpretation. The user interface 400 may further include a selectable edit icon 420 that may allow the user 104 to edit the speech processing result 404 in order to correctly reflect the user's intent. For example, the user 104 may replace "a quart of organic milk" with "a quart of orange juice," and one or more products corresponding to quart-sized orange juice products may replace the first product 406 and the second product 408 (that correspond to quart-sized organic milk products, rather than quart-sized orange juice products). In some cases, edits provided by the user 104 may be used as feedback and may improve the accuracy of speech processing.

The user interface 400 may also display a product name 422 associated with a scanned identifier obtained by the handheld electronic device 102 when operating in the scanner input mode. To illustrate, the barcode 130 scanned by the user 104 may correspond to a product name "Spokane's Worst Beer" (see e.g., the second item 124 illustrated in FIG. 3). FIG. 4 further illustrates a particular example in which the user 104 may be presented with multiple alternative products for selection that are identified based at least in part on the scanned barcode 130. To illustrate, a first product 424 may include a 12-pack of bottles of Spokane's Worst Beer, while a second product 426 may include a 6-pack of cans of Spokane's Worst Beer. That is, in some cases, alternative products identified based at least in part on the barcode 130 may correspond to different versions (e.g., size, quantity, bottled, canned) sharing the same product name 422. The first product 424 (i.e., the 12-pack of bottles) may correspond to the second item 124 in the item storage area 120 (e.g., the refrigerator) of the user 104. That is, the user 104 may have scanned a barcode on an individual bottle or on a packaging of a 12-pack of bottles. While the user 104 may desire to re-order a 12-pack of bottles, the user 104 may instead be more interested in ordering a 6-pack of cans. Thus, presenting the second product 426 via the user interface 400 may remind the user 104 that alternative options are available.

In the example of FIG. 4, the user interface 400 displays a representation of the product packaging for each of the products 424 and 426. Further, alternative or additional information associated with one or more of the products 424 and 426 (e.g., price, customer ratings, nutrition information, etc.) may be displayed to assist the user 104 in selecting a particular desired product. In the example illustrated in FIG. 4, the user 104 may add a particular quantity (e.g., one in the example of FIG. 4) of the first product 424 to the shopping cart by selecting a first selectable icon 428 (e.g., "Add to cart") associated with the first product 424. Similarly, the user 104 may add a particular quantity (e.g., one in the example of FIG. 4) of the second product 426 to the shopping cart by selecting a second selectable icon 430 associated with the second product 426. Further, the user interface 400 may include a selectable edit icon 432 that may allow the user 104 to edit the product name 422.

FIG. 4 further illustrates various options for the user 104 to search for products to add to a delivery service shopping cart. For example, a first area 434 may identify an action that the user 104 wishes to perform (e.g., "Shop"), a second area 436 may allow the user 104 to narrow a search scope (illustrated as "All" in FIG. 4), a third area 438 may allow the user 104 to input text to search for items offered by the delivery service, and the user 104 may select a selectable icon 440 (e.g., a "Go" icon) to execute the search.

Figure 5:
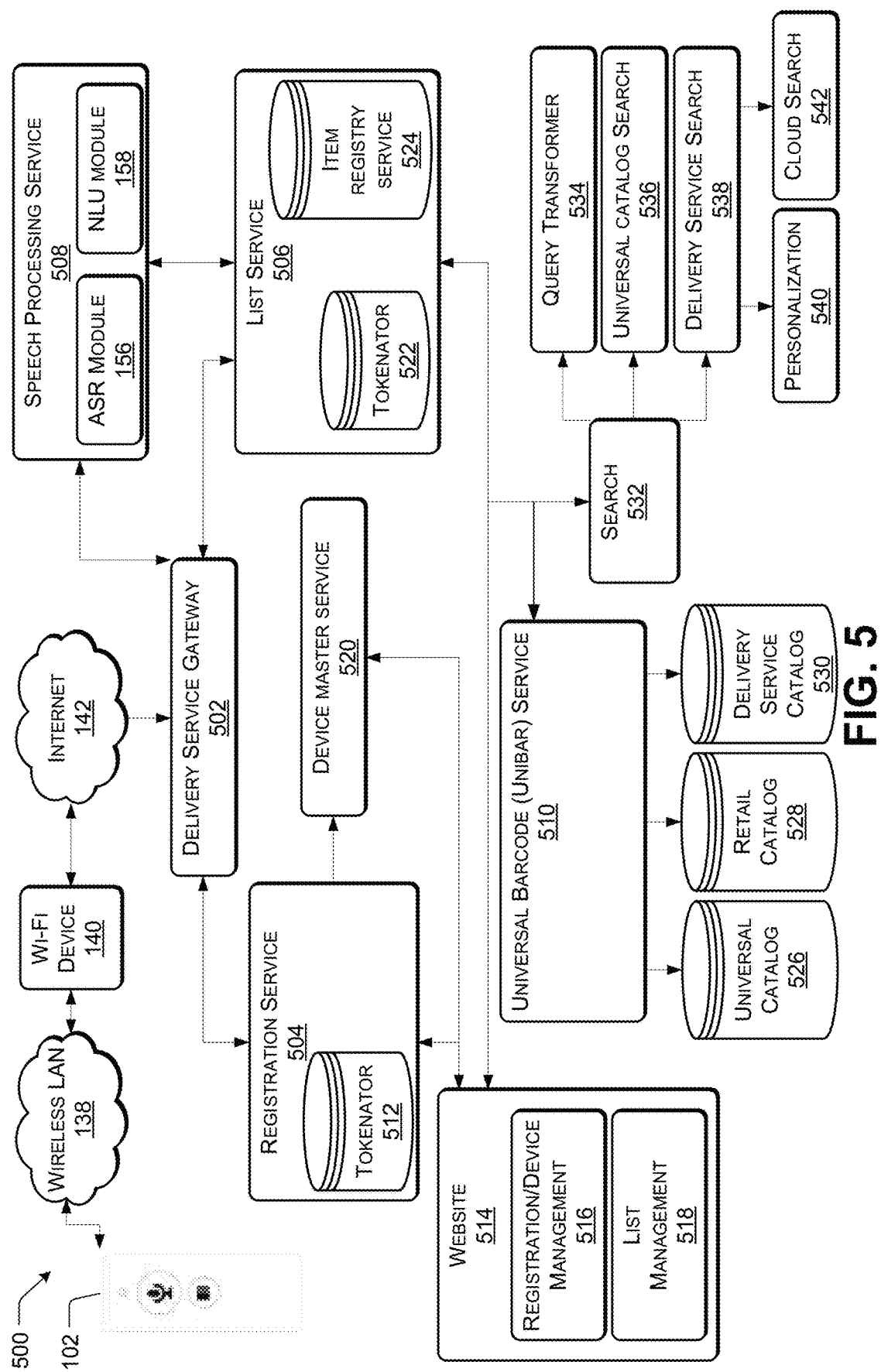
FIG. 5 illustrates an example architecture for a delivery service that receives voice and/or scanner input from a handheld electronic device, according to some implementations.

FIG. 5 illustrates an example architecture 500 according to some implementations. In the example of FIG. 5, a delivery service gateway 502 provides an interface between the handheld electronic device 102 and the remote services accessible via the Internet.

The delivery service gateway 502 allows for device registration, request authentication, and device data reporting. To illustrate, the delivery service gateway 502 may register a device (e.g., the handheld electronic device 102) using a registration service 504 that manages device registration and secret keys. Further, the delivery service gateway 502 may request authentication information from the handheld electronic device 102.

FIG. 5 further illustrates a list service 506 that is configured to store a delivery service list, to manage items, to direct voice input to a speech processing service 508, and to direct scanner input to a universal barcode (Unibar) service 510.

At registration, the registration service 504 may utilize a tokenator 512 to assign a secret token (e.g., a 160-bit random number) to the handheld electronic device 102. The handheld electronic device 102 may store the secret token in the memory 148. Requests from the handheld electronic device 102 to the one or more remote computing devices 136 via the delivery service gateway 502 are signed with a signature (e.g., a HMAC-SHA1 signature) at the end of an associated message. The delivery service gateway 502 then verifies that the signature received from the handheld electronic device 102 is correct.

FIG. 5 also illustrates that a website 514 may be used to authenticate a customer and, upon authentication, allow the customer to access a delivery service list. The website 514 may be used for registration and device management 516 as well as for list management 518.

In an example embodiment, a request from the handheld electronic device 102 may be received at the delivery service gateway 502. A device master service 520 that provides customer-to-device mapping may be used to determine a customer account and/or a customer associated with the handheld electronic device 102. The device master service 520 returns customer account information to the delivery service gateway 502. The device secret token assigned to the handheld electronic device 102 via the tokenator 512 may be provided to delivery service gateway 502. The delivery service gateway 502 may verify that a message signature in a request from the handheld electronic device 102 includes the secret token (e.g., the 160-bit random number) assigned to the handheld electronic device 102. After verifying the message signature, the delivery service gateway 502 may forward the request to the list service 506.

In some cases, a request from the handheld electronic device 102 may include a voice input received from the user 104 upon actuation of the first selectable control 106. To illustrate, referring to FIG. 2, the user 104 may actuate the first selectable control 106 and speak the voice input 206 (e.g., "a quart of organic milk"). The voice input 206 may be stored as audio data in the memory 148 (e.g., as the audio file 150) and communicated as the voice data 146 to the delivery service gateway 502.

The list service 506 may request a transcription of the voice input 206 from the speech processing service 508. In the example illustrated in FIG. 5, the speech processing service 508 may include the ASR module 156 and the NLU module 158 (see e.g., FIG. 1). The ASR module 156 may provide a transcription or N-best list of transcriptions to the NLU module 158, and the NLU module 158 may identify particular words (e.g., named entities) in the transcription or N-best list of transcriptions that are of particular importance in determining the user's intent. The NLU module 158 may generate a semantic representation of the user utterance based on the information from the ASR module 156.

The speech processing service 508 may communicate the transcription and an audio identifier to the list service 506. To store the transcription, the list service 506 may access a tokenator 522, which returns a token to the list service 506. In some cases, a list structure may be stored in an item registry service 524 to persist a list within the list service 506. As illustrated in the user interface 400 of FIG. 4, the speech processing result 404 may be displayed for user review and confirmation prior to placing an order.

In some cases, a request from the handheld electronic device 102 may include the identifier information 144 obtained by scanning a barcode or other visual identifier of a product upon actuation of the second selectable control 108. To illustrate, referring to FIG. 3, the user 104 may actuate the second selectable control 108 and scan the identifier 130 of the second item 124 in the item storage area 120. The identifier 130 may be communicated from the handheld electronic device 102 as the identifier information 144 to the delivery service gateway 502.

The list service 506 may send a request to the Unibar service 510 to look up a particular barcode. In some cases, the Unibar service 510 looks up the barcode using a universal catalog 526 to obtain product data. Further, in some cases, the Unibar service 510 may look up the barcode using a retail catalog 528 to determine a delivery-service-specific identification number. The Unibar service 510 may aggregate the information obtained from the universal catalog 526 and the retail catalog 528 and return the aggregated information to the list service 506 as product information. In some cases, the Unibar service 510 may look up the barcode in a delivery service catalog 530 that includes products that are available for delivery via the delivery service. As illustrated in the user interface 400 of FIG. 4, the product information may be displayed for user review and confirmation prior to placing an order.

In the example of FIG. 5, the website 514 may include a search service 532. A query transformer 534 may convert a product title to a search query for similar products in the event that no exact match exists for a scanned item. Further, a universal catalog search 536 may allow the user 104 to search for a particular product in the universal catalog 526, while a delivery service search 538 may allow the user to search for a particular product in the delivery service catalog 530. A personalization component 540 may allow for personalization for a particular customer based on customer account history, such as mapping of search terms to what the customer purchases. Further, a cloud search component 542 may allow the user 104 to search alternative databases for a particular product.

Figure 6:
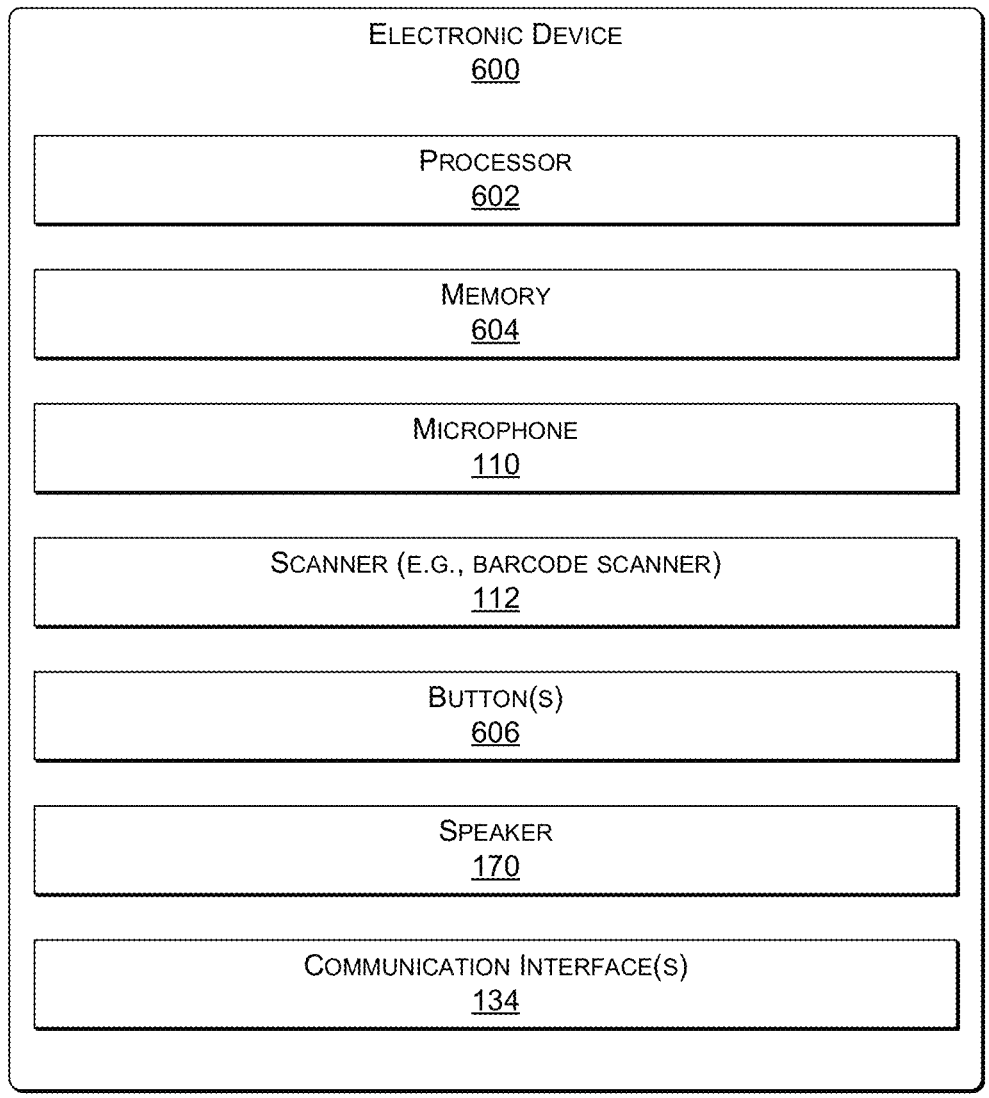
FIG. 6 illustrates select components of an example handheld electronic device to receive voice and/or scanner input to be provided to a delivery service, according to some implementations.

FIG. 6 illustrates select example components of an electronic device 600 that may be used to implement the functionality described above according to some implementations. The electronic device 600 illustrated in FIG. 6 may correspond to the handheld electronic device 102 of FIGS. 1-3. In a very basic configuration, the electronic device 600 includes, or accesses, components such as at least one processor 602 and a memory 604. Each processor 602 may itself comprise one or more processors or cores. The processor(s) 602 can be configured to fetch and execute computer-readable instructions stored in the memory 604 or other computer-readable media.

Depending on the configuration of the electronic device 600, the memory 604 may be an example of non-transitory computer storage media and may include volatile and non-volatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 602 directly or through another computing device. Accordingly, the memory 604 may be computer-readable media able to maintain instructions, modules or components executable by the processor 602.

The memory 604 may be used to store any number of functional components that are executable by the processor 602. In some implementations, these functional components comprise instructions or programs that are executable by the processor 602 and that, when executed, implement operational logic for performing the actions attributed above to the electronic device 600. Functional components of the electronic device 600 stored in the memory 604 may include one or more components for controlling and managing various functions of the electronic device 600. Depending on the type of the electronic device 600, the memory 604 may also optionally include other functional components, which may include applications, programs, drivers and so forth.

The memory 604 may also store data, data structures, and the like that are used by the functional components. For example, data stored by the memory 604 may include audio data (see e.g., the one or more audio files 150 in FIG. 1) that may represent recordings of voice input received from the user 104, one or more item identifiers (see e.g., the one or more item identifiers 152 in FIG. 1) that are associated with the scanned item(s), and other identifier(s) such as a customer account identifier and/or a device identifier (see e.g., the other identifier(s) 168 in FIG. 1). The electronic device 600 may also include other data, which may include, for example, data used by the control logic and one or more other modules. In some cases, the electronic device 600 may include a text-to-speech (TTS) module, as described above, which may be executed on the processor 602. Further, the electronic device 600 may include many other logical, programmatic and physical components, of which those described are merely examples that are related to the discussion herein.

While not shown in FIG. 6, in some cases, the electronic device 600 may include a display, which may be passive, emissive or any other form of display. In one implementation, the display may be an active display such as a liquid crystal display, plasma display, light emitting diode display, organic light emitting diode display, and so forth. Further, while not shown in FIG. 6, in some cases, the electronic device 600 may also include a camera (not shown).

In some embodiments, one or more communication interfaces 134 may support at least a wireless connection to various networks, such as a WiFi network. Further, in some cases, the one or more communication interfaces 134 may support both wired and wireless connections to various networks, such as cellular networks, radio, WiFi networks, short-range or near-field networks (e.g., Bluetooth®), infrared signals, local area networks, wide area networks, the Internet, and so forth. In some cases, the communication interfaces 134 may further allow a user to access storage on another device, such as a user's computing device, a network attached storage device, or the like.

The electronic device 600 may further be equipped with various input/output (I/O) components. For example, the control logic of the electronic device 600 may include suitable drivers configured to accept input from a keypad, keyboard, or other user actuatable controls and devices included as the I/O components. For instance, the user actuatable controls may include one or more buttons 606. To illustrate, the one or more buttons 606 may correspond to the first selectable control 106 and the second selectable control 108. Further, the electronic device 600 may include other I/O components, such as page turning buttons, navigational keys, a power on/off button, selection keys, and so on. Other examples may include a touchscreen and various user actuatable controls (e.g., buttons, a joystick, a keyboard, a mouse, etc.), at least one speaker 170, the microphone 110, connection ports, and so forth. Additionally, the electronic device 600 may include various other components that are not shown, examples of which include removable storage, a power source, such as a battery and power control unit, a global positioning system (GPS) device, a PC Card component, and so forth.

Figure 7:
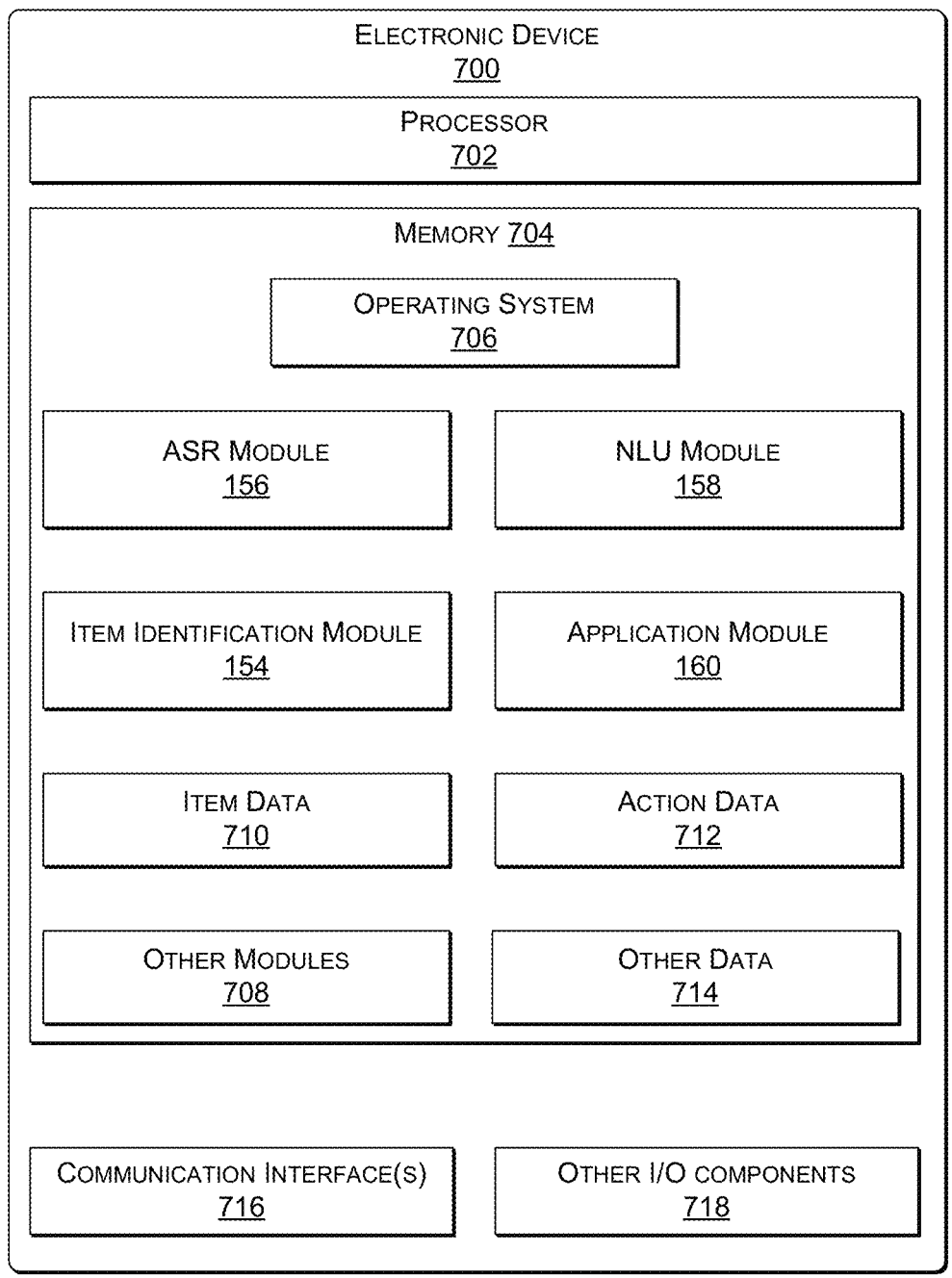
FIG. 7 illustrates select components of an example electronic device (e.g., associated with a delivery service), according to some implementations.

FIG. 7 illustrates select example components of an electronic device 700 that may be used to implement select portions of the functionality described above, according to some implementations. The electronic device 700 illustrated in FIG. 7 may correspond to the one or more remote computing devices 136 illustrated in FIG. 1. In a very basic configuration, the electronic device 700 includes, or accesses, components such as at least one processor 702 and a memory 704. Each processor 702 may itself comprise one or more processors or cores. The processor(s) 702 can be configured to fetch and execute computer-readable instructions stored in the memory 704 or other computer-readable media.

Depending on the configuration of the electronic device 700, the memory 704 may be an example of non-transitory computer storage media and may include volatile and non-volatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 702 directly or through another computing device. Accordingly, the memory 704 may be computer-readable media able to maintain instructions, modules or components executable by the processor 702.

The memory 704 may be used to store any number of functional components that are executable by the processor 702. In some implementations, these functional components comprise instructions or programs that are executable by the processor 702 and that, when executed, implement operational logic for performing the actions attributed above to the electronic device 700. Functional components of the electronic device 700 stored in the memory 704 may include the item identification module 154, the ASR module 156, the NLU module 158, and the application module 160, as described above, which may be executed on the processor 702. Other functional components may include an operating system 706 for controlling and managing various functions of the electronic device 700. Depending on the type of the electronic device 700, the computer-readable media 704 may also optionally include other functional components, such as other modules 708, which may include applications, programs, drivers and so forth.

The computer-readable media 704 may also store data, data structures, and the like that are used by the functional components. For example, data stored by the computer-readable media 704 may include item data 710 (e.g., the item database 162 of FIG. 1) accessible to the item identification module 154 and action data 712 accessible to the application module 160. The electronic device 700 may also include other data 714, which may include, for example, data used by the operating system 706 and the other modules 708. Further, the electronic device 700 may include many other logical, programmatic and physical components, of which those described are merely examples that are related to the discussion herein.

One or more communication interfaces 716 may support both wired and wireless connection to various networks, such as cellular networks, radio, WiFi networks, short-range or near-field networks (e.g., Bluetooth®), infrared signals, local area networks, wide area networks, the Internet, and so forth. The electronic device 700 may further be equipped with various other input/output (I/O) components 718. Additionally, the electronic device 700 may include various other components that are not shown.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 8:
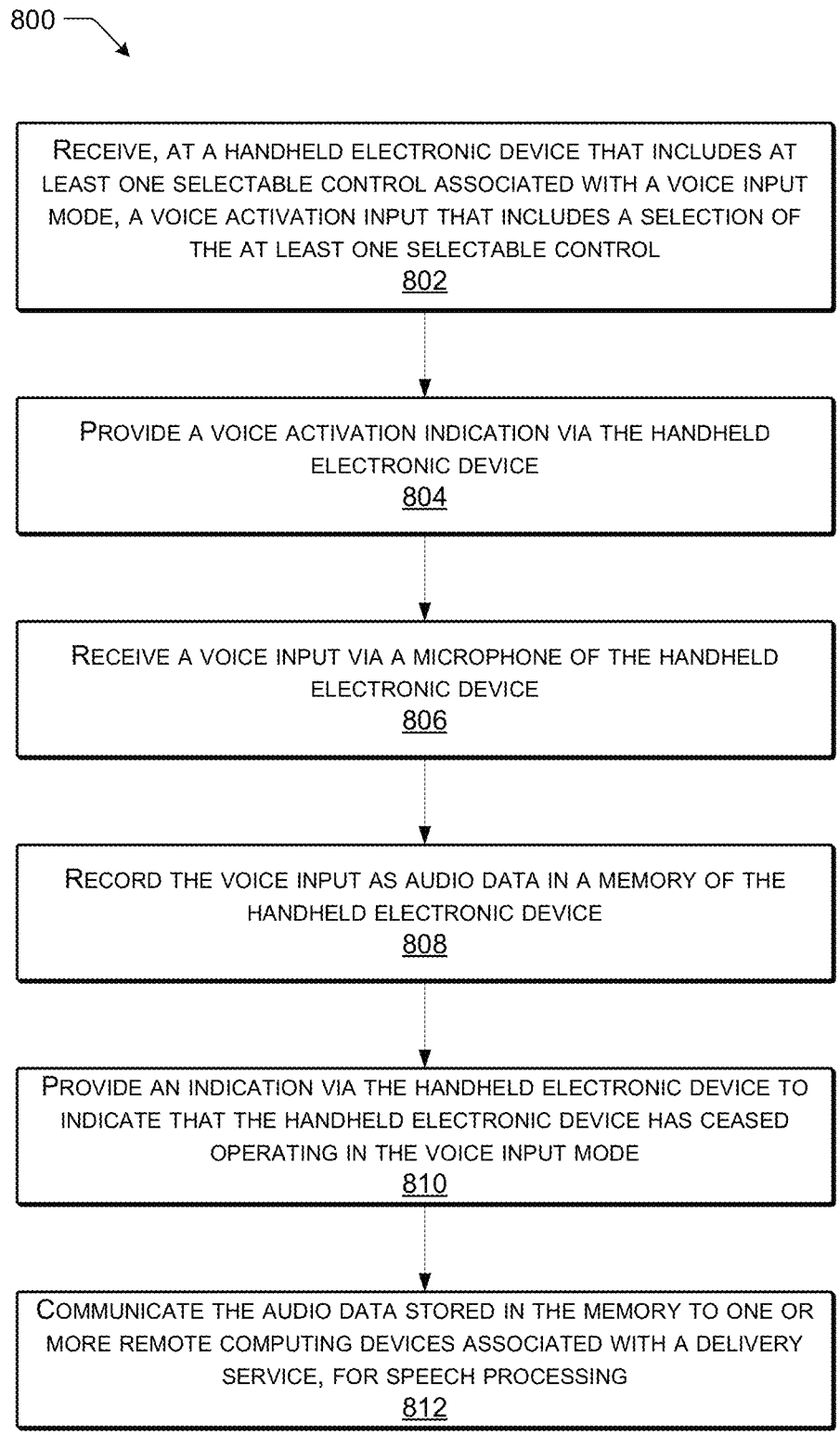
FIG. 8 illustrates an example process for using a handheld electronic device in a voice input mode, according to some implementations.
Figure 9:
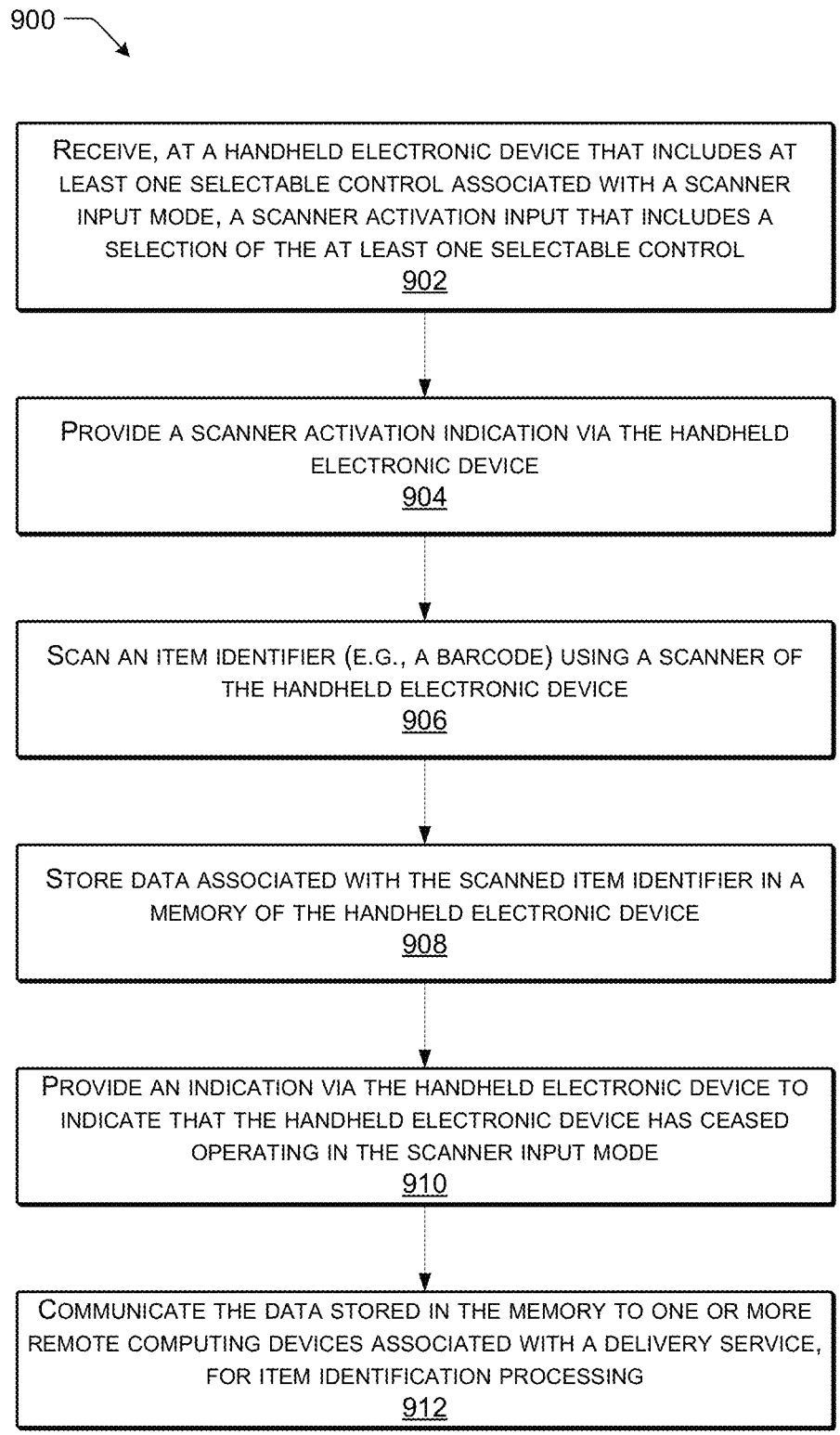
FIG. 9 illustrates an example process for using a handheld electronic device in a scanner input mode, according to some implementations.
Figure 10:
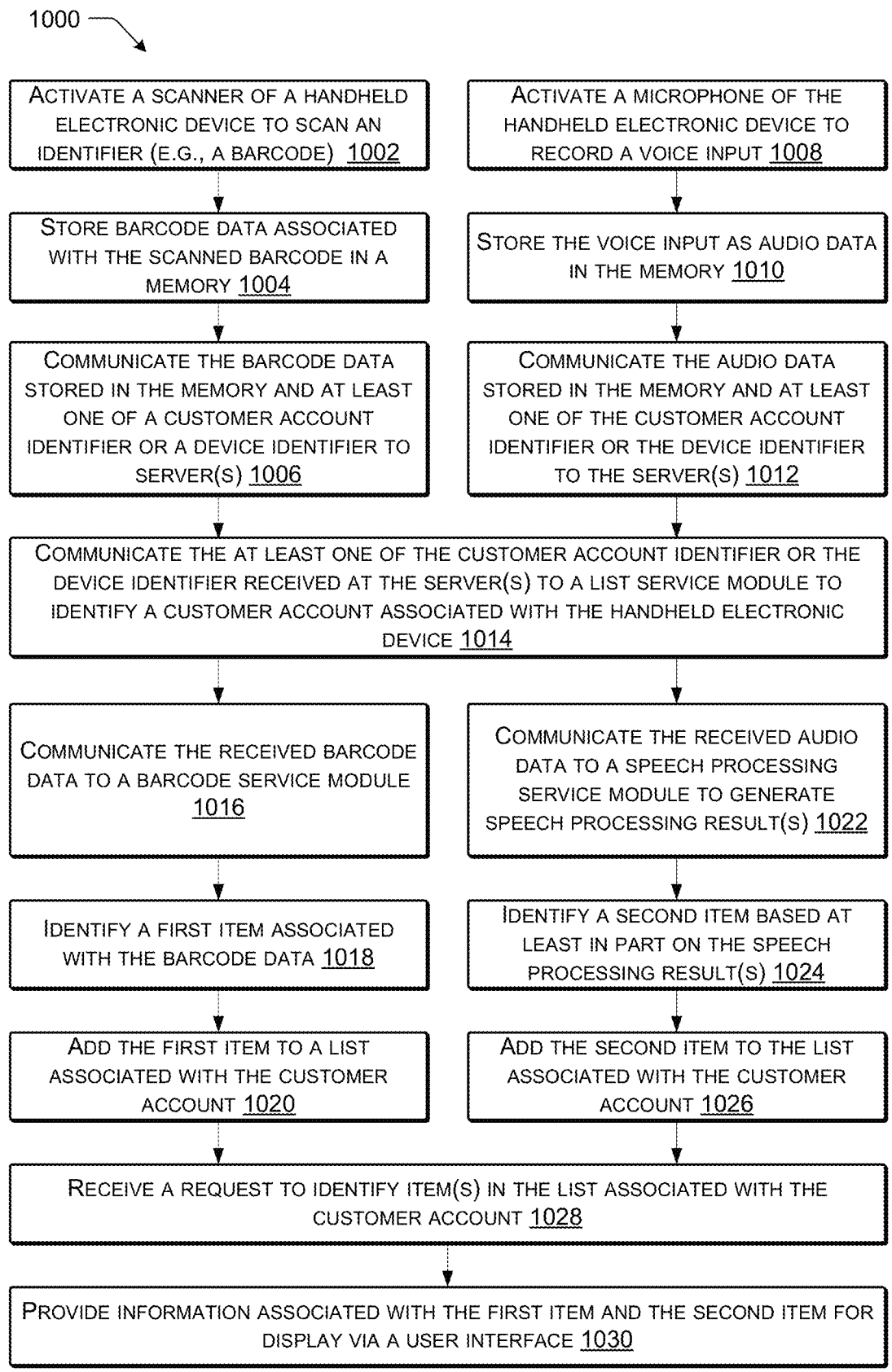
FIG. 10 illustrates an example process for providing information associated with item(s) in a list (e.g., a virtual shopping cart) for generation of a user interface, according to some implementations.

FIGS. 8 and 9 illustrate example processes 800 and 900 for using a handheld electronic device to provide voice and/or scanner input to a delivery service, as described above. FIG. 10 illustrates an example process 1000 for providing information associated with item(s) in a list (e.g., a virtual shopping cart) for generation of a user interface, as described above. FIGS. 8-10 illustrate the processes 800, 900 and 1000 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

FIG. 8 illustrates an example process 800 for using a handheld electronic device to provide voice input to a delivery service, according to some implementations.

At 802, the process 800 includes receiving, at a handheld electronic device that includes at least one selectable control associated with a voice input mode, a voice activation input that includes a selection of the at least one selectable control to enter the voice input mode. For example, referring to FIG. 2, the handheld electronic device 102 may receive the voice activation input 202 from the user 104. In the example of FIG. 2, the voice activation input 202 includes the user 104 depressing the first button 106 to activate the microphone 110 on the handheld electronic device 102 in order to record speech in a voice input mode. Alternatively, the handheld electronic device 102 may include an accelerometer or other motion sensing component, and the voice activation input may include the user 104 "bumping" or otherwise moving the handheld electronic device 102 to enter the voice input mode. As another example, the voice activation input may include the user 104 speaking a "wake word" to enter the voice input mode.

In some cases, the process 800 includes providing a voice activation indication via the handheld electronic device, at 804. The voice activation indication may alert the user 104 that the voice input mode is active and that audio received via the microphone 110 is being recorded and stored to the memory 148. To illustrate, in the example of FIG. 2, the voice activation indication 204 includes audio that is provided via the speaker 170. Alternatively or additionally, the voice activation indication 204 may include activation of one or more of the LEDs 118 or a vibration, among other alternatives.

At 806, the process 800 includes receiving a voice input via a microphone of the handheld electronic device. For example, referring to FIG. 2, the user 104 may provide the voice input 206 (e.g., "a quart of organic milk"). At 808, the process 800 includes recording the voice input as audio data in a memory of the handheld electronic device. For example, referring to FIG. 2, the voice input 206 received from the user 104 may be stored as audio data in the memory 148 (e.g., as the audio file 150). In the particular embodiment illustrated in FIG. 8, the process 800 includes, at 808, providing an indication via the handheld electronic device to indicate that the handheld electronic device has ceased operating in the voice input mode. For example, referring to FIG. 2, the voice deactivation indication 208 may include audible feedback provided to the user 104.

At 812, the process 800 includes communicating the audio data stored in the memory to one or more remote computing devices, for speech processing. For example, referring to FIG. 1, the audio data (e.g., the audio file 150) may be communicated to the one or more remote computing devices 136 associated with a delivery service as the voice data 146, for speech processing (e.g., by the ASR module 156 and the NLU module 158).

FIG. 9 illustrates an example process 900 for using a handheld electronic device to provide scanner input to a delivery service, according to some implementations.

At 902, the process 900 includes receiving, at a handheld electronic device that includes at least one selectable control associated with a scanner input mode, a scanner activation input that includes a selection of the at least one selectable control to enter the scanner input mode. For example, referring to FIG. 3, the handheld electronic device 102 may receive the scanner activation input 302 from the user 104. In the example of FIG. 3, the scanner activation input 302 includes the user 104 depressing the second button 108 in order to activate the scanner 112 to scan a barcode or other item identifier (e.g., a logo or image on a product package, a barcode on a coupon, etc.) in a scanner input mode. Alternatively, the handheld electronic device 102 may include an accelerometer or other motion sensing component, and the scanner activation input may include the user 104 "bumping" or otherwise moving the handheld electronic device 102 to enter the scanner input mode. As another example, the scanner activation input may include the user 104 speaking a "wake word" to enter the scanner input mode. In the case of a camera or other optical component, the information obtained by scanning may include barcode information or other visual information (e.g., a product logo) on a product package of the first item 122.

In some cases, the process 900 includes providing a scanner activation indication via the handheld electronic device, at 904. The scanner activation indication may alert the user 104 that the scanner input mode is active. To illustrate, in the example of FIG. 3, the scanner activation indication 304 includes audio that is provided via the speaker 170. Alternatively or additionally, the scanner activation indication 304 may include activation of one or more of the LEDs 118 or a vibration, among other alternatives. FIG. 3 further illustrates that light associated with an activated scanner, as shown at 306, may serve to notify the user 104 that the scanner input mode is active. That is, in some cases, the light associated with the activated scanner may be sufficient to alert the user 104 that the handheld electronic device 102 has entered the scanner input mode (without additional audible, visual or tactile feedback).

At 906, the process 900 includes scanning an item identifier (e.g., a barcode) using the scanner of the handheld electronic device. For example, referring to FIG. 3, the user 104 may scan the barcode 130 of the second item 124 in the item storage area 120. At 908, the process 900 includes storing data associated with the scanned item identifier in the memory. For example, data associated with the scanned barcode 130 of the second item 124 may be stored in the memory 148 (e.g., as one of the item identifier(s) 152). In the particular embodiment illustrated in FIG. 9, the process 900 includes, at 908, providing an indication via the handheld electronic device to indicate that the handheld electronic device has ceased operating in the scanner input mode. For example, referring to FIG. 3, the scanner deactivation indication 308 is illustrated as the absence of the red light associated with an activated scanner.

At 912, the process 900 includes communicating the data stored in the memory to one or more remote computing devices associated with a delivery service, for item identification processing. For example, the stored item identifier(s) 152 may be communicated to the one or more remote computing devices 136 as the identifier information 144 (e.g., as a text file that may identify a universal product code (UPC) of the scanned first item 122), for item identification processing (e.g., by the item identification module 154).

The one or more remote computing devices 136 may determine an action to be performed based at least in part on the information about the item. For example, referring FIG. 2, the voice input 206 may be associated with an item to be ordered (e.g., a quart of organic milk), and the application module 160 may determine that the action 164 to be performed includes updating a cart of the user 104 (e.g., stored in a cart database 166). As another illustrative example, while not shown in FIG. 2, a voice input from the user 104 may be associated with a request for additional item information, and the action 164 may include obtaining supplemental information (e.g., by querying the item database 162) and providing the supplemental information to the user 104.

Thus, FIGS. 8 and 9 illustrate that the handheld electronic device 102 may allow the user 104 to both scan an item to uniquely identify the item and provide voice input for speech processing and/or item identification processing.

FIG. 10 illustrates an example process 1000 for providing information associated with item(s) in a list (e.g., a virtual shopping cart) for generation of a user interface, according to some implementations.

At 1002, the process 1000 may include activating a barcode scanner to scan a barcode of an item. For example, referring to FIG. 3, the user 104 may provide the scanner activation input 302 to activate the scanner 112 of the handheld electronic device 102 by selecting the second selectable control 108 to scan the identifier 130 (e.g., barcode) of the second item 124.

At 1004, the process 1000 may include storing barcode data associated with the scanned barcode in a memory. For example, referring to FIG. 1, the handheld electronic device 102 may store barcode data associated with the scanned item identifier 130 in the memory 148 as one of the one or more item identifiers 152. Further, in some cases, the handheld electronic device 102 may include a camera (not shown in the example of FIG. 1) that may capture one or more images of the scanned item (e.g., an image of the first item 122) and store the captured image(s) as image data in the memory 148. The image data stored in the memory 148 may also be communicated to the one or more remote computing devices 136.

At 1006, the process 1000 may include communicating the barcode data stored in the memory and at least one of a customer account identifier or a device identifier to one or more servers. For example, referring to FIG. 1, the handheld electronic device 102 may communicate the item identifier(s) 152 stored in the memory 148 and at least one of a customer account identifier or a device identifier to the one or more remote computing devices 136.

At 1008, the process 1000 may include activating a microphone of the handheld electronic device to record a voice input. For example, referring to FIG. 2, the user 104 may provide the voice activation input 202 to activate the microphone 110 of the handheld electronic device 102 by selecting the first selectable control 106 to record the voice input 206.

At 1010, the process 1000 may include storing the voice input as audio data in the memory. For example, referring to FIG. 1, the handheld electronic device 102 may store the voice input 206 from the user 104 captured by the microphone 110 in the memory 148 as at least one of the one or more audio files 150.

At 1012, the process 1000 may include communicating the audio data stored in the memory and at least one of the customer account identifier or the device identifier to one or more servers. For example, referring to FIG. 1, the handheld electronic device 102 may communicate the audio file(s) 150 stored in the memory 148 and at least one of the other identifier(s) 168 (e.g., a customer account identifier or a device identifier) to the one or more remote computing devices 136.

While FIG. 10 illustrates a particular example in which the user 104 activates the scanner 112 to scan a barcode, at 1002, before activating the microphone 110 to provide a voice input, at 1008, it will be appreciated that this is for illustrative purposes only. It will be appreciated that in alternative examples, the user 104 may provide the voice input prior to activating the scanner to scan the barcode. Further, while FIG. 10 illustrates the communication of the barcode data and customer account/device ID and the communication of the audio data and customer account/device ID as separate communications, at 1006 and 1012, it will be appreciated that this is for illustrative purposes only.

At 1014, the process 1000 may include communicating the customer account/device identifier(s) received at one or more servers to a list service module of the one or more servers to identify a customer account associated with the handheld electronic device. For example, referring to FIG. 5, the customer account/device identifier(s) received from the handheld electronic device 102 at the delivery gateway 502 may be communicated to the list service 506 to identify the customer account associated with the handheld electronic device 102.

At 1016, the process 1000 includes communicating the received barcode data to a barcode service module. For example, referring to FIG. 5, the barcode data received from the handheld electronic device 102 at the delivery gateway 502 may be communicated to the universal barcode (Unibar) service 510. At 1018, the Unibar service 510 may identify a first item associated with the received barcode data (e.g., using one or more of the universal catalog 526, the retail catalog 528, or the delivery service catalog 530). At 1020, the process 1000 includes adding the first item to a list of the identified customer account. For example, referring to FIG. 5, the list service 506 may add the first item identified by the Unibar service 510 to the list of the customer account identified at step 1014.

At 1022, the process 1000 includes communicating the received audio data to a speech processing service module to generate speech processing result(s). For example, referring to FIG. 5, the audio data received from the handheld electronic device 102 at the delivery service gateway 502 may be communicated to the speech processing service 508. The speech processing service 508 may generate a speech processing result (e.g., text corresponding to a transcription of the received audio data). At 1024, the process 1000 includes identifying a second item based at least in part on the speech processing result. For example, the speech processing result generated by the speech processing service 508 may be used to identify the second item (e.g., using one or more of the universal catalog 526, the retail catalog 528, or the delivery service catalog 530). At 1026, the process 1000 includes adding the second item to the list of the identified customer account. For example, referring to FIG. 5, the list service 506 may add the second item identified based at least in part on the speech processing result generated by the speech processing service 508 to the list of the customer account identified at step 1014.

At 1028, the process 1000 includes receiving a request (e.g., from a web browser client or another application) to identify one or more items in the list associated with the identified customer account. For example, referring to FIG. 5, the request may be received from a web server associated with the website 514. The process 1000 includes determining information associated with the one or more items in the list in response to the request. For example, the request may include a request to the list service 506 to identify item(s) in the list of a customer account associated with a customer that is authenticated via the website 514. To illustrate, the list service 506 may determine that the item(s) in the list include the first item added to the list at 1020 and the second item added to the list at 1026. At 1030, the process 1000 includes providing the information associated with the first item and the second item for display via a user interface. For example, the user interface may correspond to the user interface 400 illustrated in FIG. 4.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
under control of one or more processors, identifying a user account associated with an electronic device based at least in part on a user account identifier or a device identifier, the user account associated with a first order associated with a first item associated with an item type;
receiving, from the electronic device, first audio data that represents a voice input;
performing one or more speech processing operations to generate a semantic representation of the first audio data, the semantic representation comprising a representation of a user intent and a second item among a plurality of items associated with the item type;
determining that the second item corresponds to the first item;
generating, based at least in part on the representation of the user intent and the first item, output data for performing an action associated with the user intent; and
initiating a second order of the first item based at least in part on the output data.

2. The method as recited in claim 1, further comprising receiving, from the electronic device, image data representing an item identifier.

3. The method as recited in claim 2, wherein identifying the user account occurs at a first time, and wherein the method further comprises:
identifying, at a second time, the first item based at least in part on the item identifier represented by the image data; and
initiating a third order of the first item.

4. The method as recited in claim 1, further comprising:
identifying at least one other item based at least in part on identifying the user account; and
adding an indication of the at least one other item to a list associated with the user account.

5. The method as recited in claim 4, wherein identifying the at least one other item comprises at least one of:
identifying one or more alternative products having a same product name as the first item; or
identifying one or more alternative products having one or more brand names that are different from a brand name of the first item.

6. The method as recited in claim 1, wherein:
the user account is associated with a purchase history, the purchase history indicating at least the first order associated with the first item; and
identifying the first item based at least in part on the purchase history.

7. A system comprising:
one or more processors; and
one or more non-transitory computer-readable media storing instructions that, when executed by the one or more processors, cause the one or more processors to perform operations comprising:
identifying a user account associated with an electronic device based at least in part on a user account identifier or a device identifier, the user account associated with a first order associated with a first item associated with an item type;
receiving, from the electronic device, first audio data that represents a voice input;
performing one or more speech processing operations to generate a semantic representation of the first audio data, the semantic representation comprising a representation of a user intent and a second item among a plurality of items associated with the item type;
determining that the second item corresponds to the first item;
generating, based at least in part on the representation of the user intent and the first item, output data for performing an action associated with the user intent; and
initiating a second order of the first item based at least in part on the output data.

8. The system as recited in claim 7, the operations further comprising:
causing searching of a catalog using the semantic representation;
identifying at least one other item based at least in part on causing the searching of the catalog; and
adding an indication of the at least one other item to a list associated with the user account.

9. The system as recited in claim 8, wherein the first item includes a product previously ordered for delivery; and
identifying the at least one other item comprises identifying at least one alternative product that is different from the product.

10. The system as recited in claim 7, the operations further comprising:
receiving a request to identify one or more items associated with the user account; and
in response to receiving the request, communicating information associated with the first item via a user interface.

11. The system as recited in claim 10, wherein:
receiving the request comprises receiving the request from a web server; and
communicating the information comprises communicating the information to the web server via the user interface.

12. The system as recited in claim 10, wherein:
the electronic device comprises a first electronic device;
receiving the request comprises receiving the request from a second electronic device, the second electronic device being different from the first electronic device; and
communicating the information comprises communicating the information to the second electronic device via the user interface.

13. The system as recited in claim 7, the operations further comprising:
storing the output data as an audio file; and
outputting for display, via a user interface, the semantic representation and a selectable icon to replay the audio file.

14. The system as recited in claim 7, the operations further comprising receiving second audio data representing additional voice input wherein the additional voice input is associated with at least one of:
feedback with respect to a particular product; or
supplemental information associated with the particular product.

15. The system as recited in claim 14, wherein the additional voice input is associated with requesting supplemental information associated with the particular product, and the operations further comprise:
determining the supplemental information associated with the particular product; and
sending the supplemental information to the electronic device.

16. A method comprising:
under control of one or more processors, sending, from an electronic device, first audio data and second audio data generated by one or more microphones of the electronic device to one or more remote computing devices, wherein the first audio data represents a voice input representing a first item associated with an item type and the second audio data represents a user intent associated with the first item;
receiving, from the one or more remote computing resources, a semantic representation of the first audio data generated by one or more speech processing operations, the semantic representation comprising a representation of the user intent and a second item among a plurality of items associated with the item type;
sending, from the electronic device third audio data generated by the one or more microphones and representing a command to order the first item, wherein the command includes the representation of the user intent and the second item; and
receiving, from the one or more remote computing resources, confirmation of an order for the first item.

17. The method as recited in claim 16, further comprising sending, from the electronic device, image data generated by one or more optical sensors on the electronic device to the one or more remote computing devices.

18. The method as recited in claim 16, further comprising sending a request to identify one or more items associated with a user account.

19. The method as recited in claim 16, further comprising:
determining that the electronic device is not connected to a Wi-Fi device; and
storing a command to order an additional item, based at least in part on determining that the electronic device is not connected to the Wi-Fi device.

20. The method as recited in claim 19, further comprising:
determining that the electronic device is connected with the Wi-Fi device; and
sending the command to order the additional item, based at least in part on determining that the electronic device is connected with the Wi-Fi device.

* * * * *